(12) United States Patent
Hartwick et al.

(10) Patent No.: US 7,778,756 B2
(45) Date of Patent: Aug. 17, 2010

(54) TRACK TRENCHER PROPULSION SYSTEM WITH LOAD CONTROL

(75) Inventors: Ty Hartwick, Pella, IA (US); Mark Cooper, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 306 days.

(21) Appl. No.: 11/770,909

(22) Filed: Jun. 29, 2007

(65) Prior Publication Data

US 2009/0000156 A1 Jan. 1, 2009

(51) Int. Cl.
*G06F 7/70* (2006.01)
*G06F 19/00* (2006.01)
*G06G 7/00* (2006.01)
*G06G 7/76* (2006.01)

(52) U.S. Cl. ......................................... 701/50; 37/348
(58) Field of Classification Search ................... 701/50; 37/348

See application file for complete search history.

(56) References Cited

U.S. PATENT DOCUMENTS

| | | | |
|---|---|---|---|
| 3,750,762 A | 8/1973 | Eaton | |
| 3,876,020 A | 4/1975 | Barsby | |
| 4,013,875 A | 3/1977 | McGlynn | |
| 4,076,090 A | 2/1978 | Krusche et al. | |
| 4,111,066 A | 9/1978 | Kendrick | |
| 4,173,836 A | 11/1979 | Paurat | |
| 4,175,628 A | 11/1979 | Cornell et al. | |
| 4,255,883 A | 3/1981 | Ealy | |
| 4,301,910 A | 11/1981 | Price | |
| 4,423,785 A | 1/1984 | Kurihara et al. | |
| 4,541,497 A | 9/1985 | Riediger et al. | |
| 4,677,579 A | 6/1987 | Radomilovich | |
| 4,699,239 A | 10/1987 | Ishino et al. | |
| 4,702,358 A | 10/1987 | Mueller et al. | |
| 4,715,012 A | 12/1987 | Mueller, Jr. | |
| 4,727,353 A | 2/1988 | Ruhter | |
| 4,945,221 A | 7/1990 | Nielsen et al. | |
| 5,065,320 A | 11/1991 | Hayashi et al. | |
| 5,065,326 A | 11/1991 | Sahm | |
| 5,088,020 A | 2/1992 | Nishida et al. | |
| 5,101,919 A | 4/1992 | Ossi | |

(Continued)

FOREIGN PATENT DOCUMENTS

DE       27 00 950 B1    3/1978

(Continued)

OTHER PUBLICATIONS

DC2 Microcontroller, *Sauer Sundstrand*, 3 pages (Mar. 1993).

(Continued)

*Primary Examiner*—Jack Keith
*Assistant Examiner*—Rami Khatib
(74) *Attorney, Agent, or Firm*—Merchant & Gould P.C.

(57) ABSTRACT

A system and process for controlling propulsion and steering of a track trencher excavation machine powered by an engine includes a multiple mode propulsion and steering control system that performs a plurality of functions depending on a selection of one of a plurality of operational modes. A controller generates a vehicle propulsion hydrostatic drive signal using an engine speed to determine a load multiplier. The load multiplier being defined as a function of the engine speed and an operator adjustable load control setting.

25 Claims, 29 Drawing Sheets

U.S. PATENT DOCUMENTS

| | | | |
|---|---|---|---|
| 5,182,713 A | | 1/1993 | Kitoh |
| 5,212,998 A | | 5/1993 | Testerman |
| 5,293,944 A | | 3/1994 | Matsumoto |
| 5,297,019 A | | 3/1994 | Zuehike |
| 5,297,649 A | | 3/1994 | Yamamoto et al. |
| RE34,576 E | | 4/1994 | Camilleri |
| 5,325,933 A | | 7/1994 | Matsushita |
| 5,347,448 A | | 9/1994 | Nam |
| 5,361,211 A | * | 11/1994 | Lee et al. ................. 701/50 |
| 5,363,304 A | | 11/1994 | Awano et al. |
| 5,398,766 A | | 3/1995 | Nakayama et al. |
| 5,424,623 A | | 6/1995 | Allen et al. |
| 5,456,333 A | | 10/1995 | Brandt et al. |
| 5,509,220 A | * | 4/1996 | Cooper ..................... 37/348 |
| 5,544,055 A | | 8/1996 | Cooper |
| 5,574,642 A | | 11/1996 | Cooper |
| 5,576,962 A | * | 11/1996 | Ferguson et al. ........... 701/101 |
| 5,590,041 A | | 12/1996 | Cooper |
| 5,681,242 A | | 10/1997 | Bates |
| 5,768,811 A | * | 6/1998 | Cooper ..................... 37/348 |
| 5,893,677 A | | 4/1999 | Haehn et al. |
| 5,918,527 A | * | 7/1999 | Haga et al. ............. 91/363 R |
| 5,975,214 A | | 11/1999 | Okamura et al. |
| 6,022,292 A | | 2/2000 | Goodnight |
| 6,317,669 B1 | | 11/2001 | Kurenuma et al. |
| 6,371,566 B1 | | 4/2002 | Haehn |
| 6,728,619 B2 | * | 4/2004 | Adachi et al. ................. 701/50 |
| 6,729,050 B2 | | 5/2004 | Whitten et al. |
| 6,766,236 B1 | * | 7/2004 | Lamela et al. ................. 701/50 |
| 6,823,672 B2 | * | 11/2004 | Nakamura ................. 60/449 |
| 6,851,495 B2 | | 2/2005 | Sprinkle et al. |
| 7,077,345 B2 | * | 7/2006 | Byram et al. ................. 241/35 |
| 2002/0139013 A1 | * | 10/2002 | Hammerle ................. 37/348 |
| 2005/0004734 A1 | | 1/2005 | Cripps |
| 2005/0177291 A1 | * | 8/2005 | Strashny et al. ............... 701/50 |
| 2005/0278100 A1 | | 12/2005 | Porter |
| 2006/0011400 A1 | * | 1/2006 | Thomas et al. ............. 180/307 |
| 2006/0235595 A1 | * | 10/2006 | Sawada ..................... 701/50 |
| 2009/0000154 A1 | | 1/2009 | Hartwick |
| 2009/0000157 A1 | | 1/2009 | Hartwick |

FOREIGN PATENT DOCUMENTS

| | | |
|---|---|---|
| EP | 0 803 614 A1 | 10/1997 |
| EP | 0 905 325 A1 | 3/1999 |
| EP | 1 260 716 A1 | 11/2002 |
| JP | 3-70683 | 3/1991 |
| WO | WO 91/02853 | 3/1991 |
| WO | WO 94/02346 | 2/1994 |

OTHER PUBLICATIONS

DP600 Series Graphical Terminals, *Sauer Danfoss*, 2 pages (Jan. 2006).

Introducing Tesmec's all-new Mechanical Series, *Tesmec*, 2 pages pages (Publicly known at least as early as Jun. 29, 2007).

IX024-010-00000 Plus=1 Input Module, *Sauer Danfoss*, 2 pages (Jan. 2006).

MC050-010-00000 PLUS+1 Controller, *Sauer Danfoss*, 2 pages (Jan. 2006).

MC050-020-00000 PLUS+1 Controller, *Sauer Danfoss*, 2 pages (Jan. 2006).

MCE101C Load Controller, *Sauer Sundstrand*, 3 pages (Feb. 1990).

OX024-010-00000 PLUS+1 Output Module, *Sauer Danfoss*, 2 pages (Jan. 2006).

PLUS+1 Guide Starter Kit and Development System, *Sauer Danfoss*, 2 pages (Jan. 2006).

PLUS+1 Guide User Manual, *Sauer Danfoss*, pp. 1-450 (Apr. 2007).

International Search Report and Written Opinion mailed Nov. 5, 2008.

International Search Report and Written Opinion mailed Oct. 7, 2008 relating to PCT Application PCT/US2008/068335.

Invitation to Pay Additional Fees with Partial International Search mailed Nov. 4, 2008 relating to PCT Application PCT/US2008/068346.

International Search Report and Written Opinion mailed Mar. 17, 2009 relating to PCT Application PCT/US2008/068346.

Office Action mailed May 27, 2009 relating to U.S. Appl. No. 11/771,171.

* cited by examiner

FIG.12C

PRESET SETTINGS — 393

| | |
|---|---|
| MAX ENGINE OPERATING SPEED | 304 |
| WIDTH OF PROPORTIONAL BAND | 305 |
| SATURATED PUMP SIGNAL VALUE | 316 |
| PROPORTIONAL FACTOR | 340 |
| INTEGRAL FACTOR | 341 |
| ••• | |
| DERIVATIVE FACTOR | 342 |
| TIME VARIABLE | 343 |
| ERROR LIMIT | 344 |
| MAX HIGH RANGE MOTOR SPEED | 351 |
| MAX LOW RANGE MOTOR SPEED | 352 |
| FULL SCALE MOTOR PRESSURE | 353 |

FIG.12B

CALCULATED VALUES — 392

| | |
|---|---|
| LOWER PROPORTIONAL BAND BOUNDARY | 310 |
| UPPER PROPORTIONAL BAND BOUNDARY | 311 |
| LOAD MULTIPLIER | 317 |
| EFFECTIVE ATTACHMENT DRIVE PRESSURE | 346 |
| ATTACHMENT CORRECTION FACTOR | 348 |
| MAX DRIVE MOTOR SPEED | 350 |
| LEFT ERROR | 361 |
| LEFT SPEED ERROR | 361S |
| ••• | |
| LEFT PRESSURE ERROR | 361P |
| RIGHT ERROR | 362 |
| RIGHT SPEED ERROR | 362S |
| RIGHT PRESSURE ERROR | 362P |
| EFFECTIVE LEFT ERROR | 363 |
| EFFECTIVE RIGHT ERROR | 364 |
| INTERMEDIATE LEFT PID CORRECTION | 365 |
| INTERMEDIATE RIGHT PID CORRECTION | 366 |
| LEFT CORRECTION FACTOR | 371 |
| RIGHT CORRECTION FACTOR | 372 |
| EFFECTIVE ATTACHMENT CORRECTION | 373 |

FIG.12A

OPERATOR SETTINGS — 391

| | |
|---|---|
| LOAD LIMIT | 303 |
| LOW PROPEL LIMIT | 306L |
| HIGH PROPEL LIMIT | 306H |
| FEEDBACK SELECTOR | 325 |
| ••• | |
| ATTACHMENT FEEDBACK ENABLE | 326 |
| LOWER PRESSURE BAND BOUNDARY | 327 |
| UPPER PRESSURE BAND BOUNDARY | 328 |

FIG.12D

CALIBRATED VALUES — 394

| | |
|---|---|
| LEFT TRACK PUMP THRESHOLD | 302L |
| ••• | |
| RIGHT TRACK PUMP THRESHOLD | 302R |

TRACK TRENCHER PROPULSION SYSTEM WITH LOAD CONTROL

TECHNICAL FIELD

The present invention relates generally to the field of excavation and, more particularly, to a multiple operational mode propulsion control, and a system and process for controlling propulsion of a track trencher.

BACKGROUND

A track trencher 30 excavation machine, shown in FIGS. 1 and 2, typically includes an engine 36 coupled to a left track drive 32 and a right track drive 34 which together comprise a tractor portion 45 of the track trencher 30. An attachment 46, usually coupled to the rear of the tractor portion 45, typically performs a specific type of excavating operation.

A ditcher chain 50 is often employed to dig relatively large trenches at an appreciable rate. The ditcher chain 50 generally remains above the ground in a transport configuration 56 when maneuvering the trencher 30 around a work site. During excavation, the ditcher chain 50 is lowered, penetrates the ground, and excavates a trench at the desired depth and speed while in a trenching configuration 58.

Another popular trenching attachment is termed a rock wheel 60 in the art, shown in FIG. 3, and may be operated in a manner similar to that of the ditcher chain 50. Additional attachments, such as a TERRAIN LEVELER™, manufactured by Vermeer Manufacturing Company of Pella, Iowa, are also known in the art and are also operated in a similar manner.

As shown in FIG. 4, a steering control 592 is typically provided for directional control, and a propel control 590 is typically provided to limit the speed of the track trencher 30. An engine throttle 506 is typically provided to limit the engine 36 speed. These controls allow an operator to maneuver the track trencher 30 in both transport and trenching configurations 56 and 58.

Certain existing track trenchers 30 are designed with a multi-mode track steering and propulsion system. The trencher operator selects the mode best suited for the type of maneuver required and operating environment present at any given moment. In certain existing track trenchers 30, this selection is made by setting an operating mode selector switch 594 and a track motor range selector switch 596 on an operator's control console. A transport setting of the operating mode selector switch 594 is typically suited for the transport configuration 56 of the trencher while a trench setting is typically suited for the trenching configuration 58. The high/low motor range selector switch 596 is typically used to select the relative trencher 30 ground speed that is desired.

Particular range and/or mode settings are generally determined by a number of factors during excavation, including the desired trenching speed and the type of soil being subject to excavation. For example, a high range setting of the switch 596 is generally appropriate for trenching through softer soil, whereby the track trencher 30 will typically operate at a relatively higher speed with a lower tractive effort. The lower tractive effort exerted at a higher speed allows a high percentage of available power to be utilized. Upon encountering more compacted soil, such as concrete, the tractive effort applied to the trenching attachment 46, typically powered by the engine 36, will increase, resulting in a corresponding reduction in the speed of the track trencher 30. The higher tractive effort exerted at a lower speed also allows a high percentage of available power to be utilized. In the latter case, a low range setting of the switch 596 is generally appropriate.

The control systems of certain existing track trenchers 30 are reconfigured by selecting between the various operating modes and ranges altering the relationships between the inputs and outputs.

A track trencher excavation machine typically employs one or more sensors that monitor various physical parameters of the machine. The information gathered from the sensors is generally used as an input to moderate a particular machine function, and/or to provide the operator with information, typically by transducing a sensor signal for communication to one or more screens 500 or display instruments, such as a tachometer, for example.

It is generally desirable to maintain the engine 36 at a constant output level during excavation in a trench mode which, in turn, allows the trenching attachment 46 to operate at an optimum trenching output level. In certain applications, it is desired to maintain the engine 36 at its maximum power output level. Controlling the track trencher 30 during excavation by employing a feedback control system as disclosed in U.S. Pat. No. 5,509,220 issued Apr. 23, 1996 eliminates the need for the operator to make frequent adjustments to the propel control 590 in order to maintain the engine 36 at a target engine output level.

There is a desire among the manufacturers of track trenchers to minimize the difficulty of operating a track trencher both in a transport mode and in a trench mode and to increase the productivity of the track trencher in a variety of operating conditions. The present invention fulfills these needs.

SUMMARY

The present disclosure relates to a propulsion control system and process for operating a track trencher comprising a multiple mode propel and steering control that functions in a plurality of operational modes in response to a selection of one of the track trencher operational modes. In particular, the present disclosure concerns a control system with a high trench mode, a low trench mode, and a transport mode that receives feedback from track drive speeds, an engine speed, track drive hydraulic pressures, and an attachment drive hydraulic pressure. An operator adjustable setting modifies the control system response by changing a relationship between a track drive signal and the engine speed. The characteristics of the various modes can be further modified by selecting various propel motor speed ranges.

BRIEF DESCRIPTION OF THE DRAWINGS

FIG. 12A is a block diagram illustrating an example list of variables relating to a plurality of operator settings used within the computer network of FIG. 12;

FIG. 12B is a block diagram illustrating an example list of variables relating to a plurality of calculated values calculated by and used within the computer network of FIG. 12;

FIG. 12C is a block diagram illustrating an example list of variables relating to a plurality of preset settings used within the computer network of FIG. 12;

FIG. 12D is a block diagram illustrating an example list of variables relating to a plurality of calibrated values used within the computer network of FIG. 12;

DETAILED DESCRIPTION

The present disclosure, as previously indicated, relates to a propulsion and steering control system and process for controlling propulsion and steering of a track trencher 30. The present disclosure describes a plurality of features and modes of a system and process for controlling propulsion and steering to permit an appreciation of the various functions and activities within the system. In a preferred configuration, the control system includes a computer network 182 which calculates various parameters, coordinates various functions, and communicates with the operator. In an example configuration, the computer network 182 includes a plurality of controllers and other components compliant with a PLUS+1™ standard defined by Sauer-Danfoss, Inc. of Ames, Iowa. Example controller modules include an MC050-010 controller module, an MC050-020 controller module, an IX024-010 input module, and an OX024-010 output module all of which are sold by Sauer-Danfoss, Inc. of Ames, Iowa. In an example configuration, various parameters are stored in a non-volatile memory and a software code is held in an EPROM.

Figure 5:
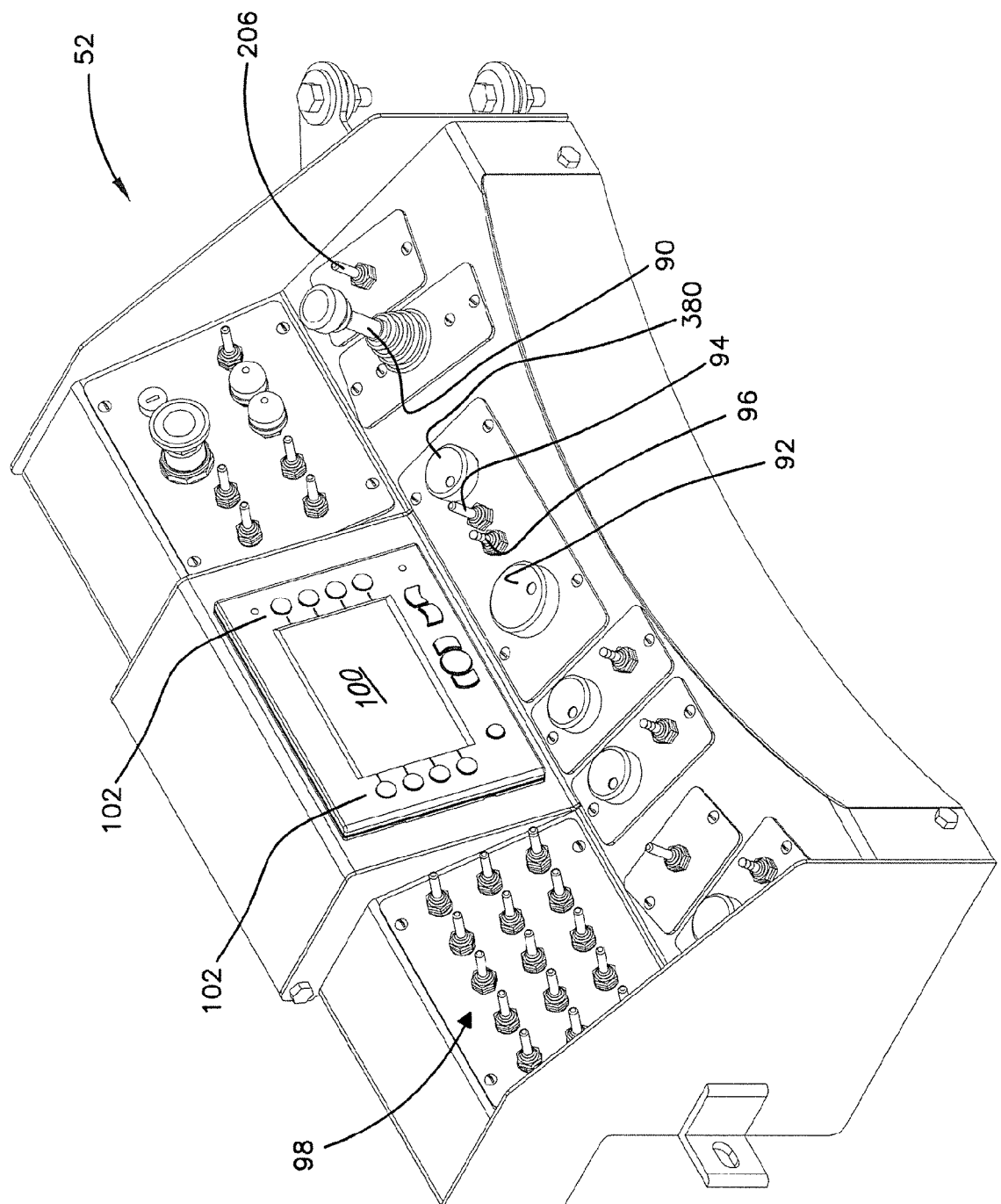
FIG. 5 is a full perspective view of a track trencher control panel incorporating a multi-mode propel control, a multi-mode steering control, a load control knob, an operating mode selector switch, a track motor range selection switch, and a display with a plurality of menu navigation and selection buttons.
Figure 6:
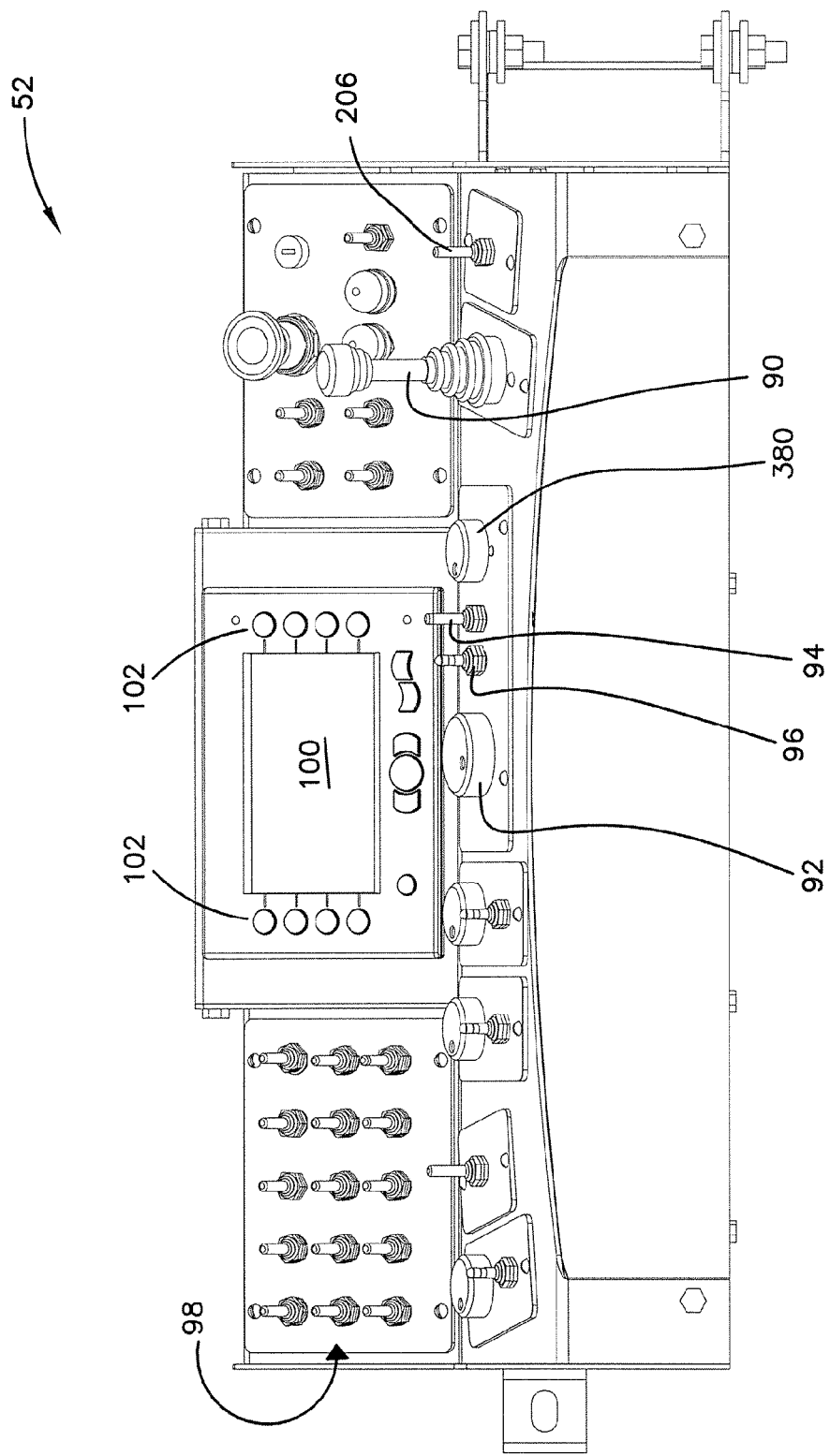
FIG. 6 is a full elevation view of the control panel of FIG. 5.

Referring now to the figures, and more particularly to FIGS. 5 and 6, there is shown an operator control panel 52 including a multi-mode propel control 90, a multi-mode steering control 92, an operating mode selector switch 94, a load control knob 380, an engine throttle 206, a track motor range selector switch 96, and an operator display 100 with a plurality of software menu navigation and selection buttons 102. The operator panel 52 controls and functions are provided for operating and configuring a track trencher such as the track trencher 30. More particularly, these controls operate the track trencher 30 by regulating a left track drive 32 and a right track drive 34. In one embodiment, the propel control 90, the steering control 92, the operating mode selector switch 94, the track motor range selector switch 96, and software menu settings operate in combination to effectively propel and steer the track trencher 30 in one of a plurality of operating modes. The propel control 90 and steering control 92 are preferably multi-mode controls, with each control 90 and 92 performing a plurality of functions depending on the selected operating mode, propel motor range, and control system software menu settings.

Figure 7:
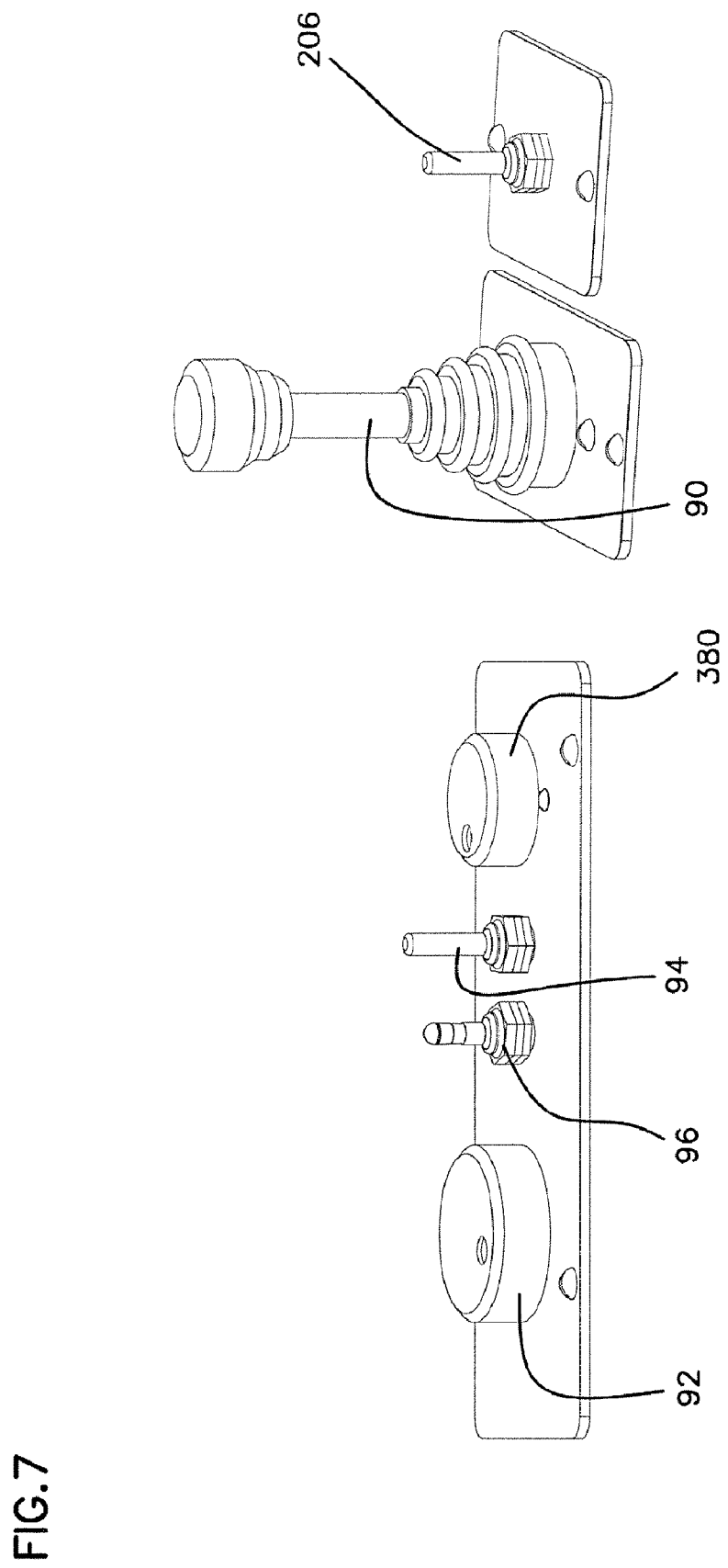
FIG. 7 is a fragmentary view of the control panel of FIGS. 5 and 6.

One important advantage of the control scheme illustrated in FIGS. 5 through 7 concerns the effective uncoupling, or separating, of the steering control functions from the propulsion control functions for controlling the track trencher 30. Propulsion of the left and right track drives 32 and 34 is controlled by the propel control 90, while steering of the track trencher 30 is independently controlled by the steering control 92. Controlling the track trencher 30 while operating in any one of a plurality of operating modes is substantially simplified by employing the multi-mode propel and steering controls 90 and 92.

Figure 8:
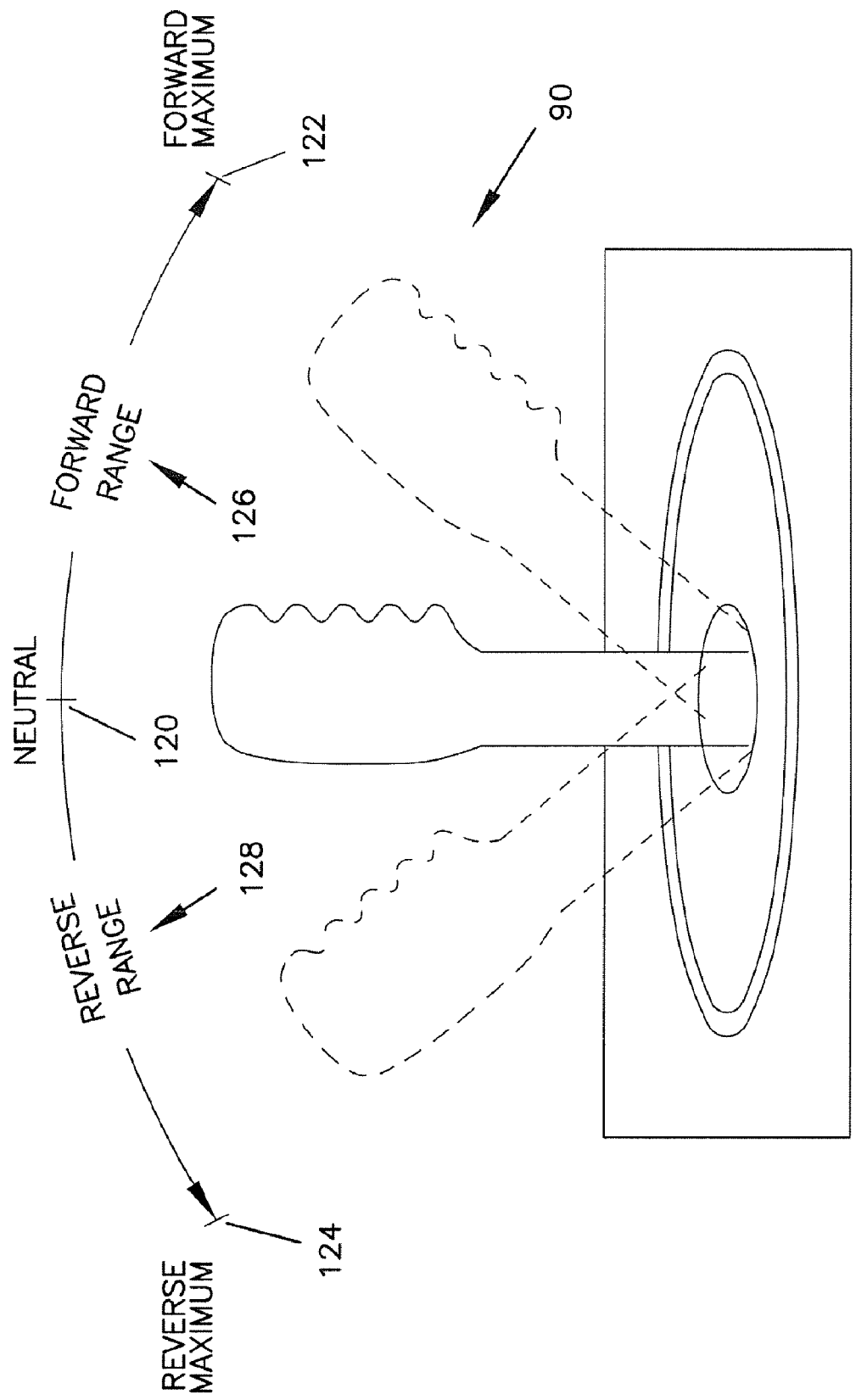
FIG. 8 is an illustration of the multi-mode propel control of FIGS. 5 through 7 and associated functions when operating the track trencher.

Referring now to FIGS. 7 and 8, there is shown the multi-mode propel control 90 for controlling propulsion of the track trencher 30 in one of a plurality of operating modes. The propel control 90 has a neutral setting 120, a maximum forward setting 122, a maximum reverse setting 124, and a range of forward and reverse settings 126 and 128. By way of illustration, and not of limitation, the multi-mode propel control 90 is preferably operable in various transport modes and various trench modes. Selection of a particular transport or trench mode of operation is preferably determined by the state of the operating mode selector switch 94, which, together with the track motor range selector switch 96 and control system software menu settings, modifies the functionality of the propel control 90.

As an example of one embodiment, illustrated in FIG. 7, the track trencher 30 is operated in a transport mode that is preferably accomplished by setting the operating mode selector switch 94 to a transport setting. The propulsion, forward and reverse, of the track trencher 30 is preferably dependent on the positioning of the propel control 90 between forward and reverse maximum settings 122 and 124. The propel control 90 produces a propel signal 309 (see FIG. 12) that is preferably proportional to the displacement of the propel control 90 in either the forward or reverse direction with respect to the neutral setting 120. Furthermore, the propel signal is preferably representative of a target track motor speed measured in revolutions-per-minute (RPM). Optionally, the propel control characteristics may be additionally modified by the propel motor range selector switch 96 and control system software menu settings.

In other embodiments, the propel signal can be representative of a target track pump pressure measured in pounds per square inch (PSI).

Figure 9:
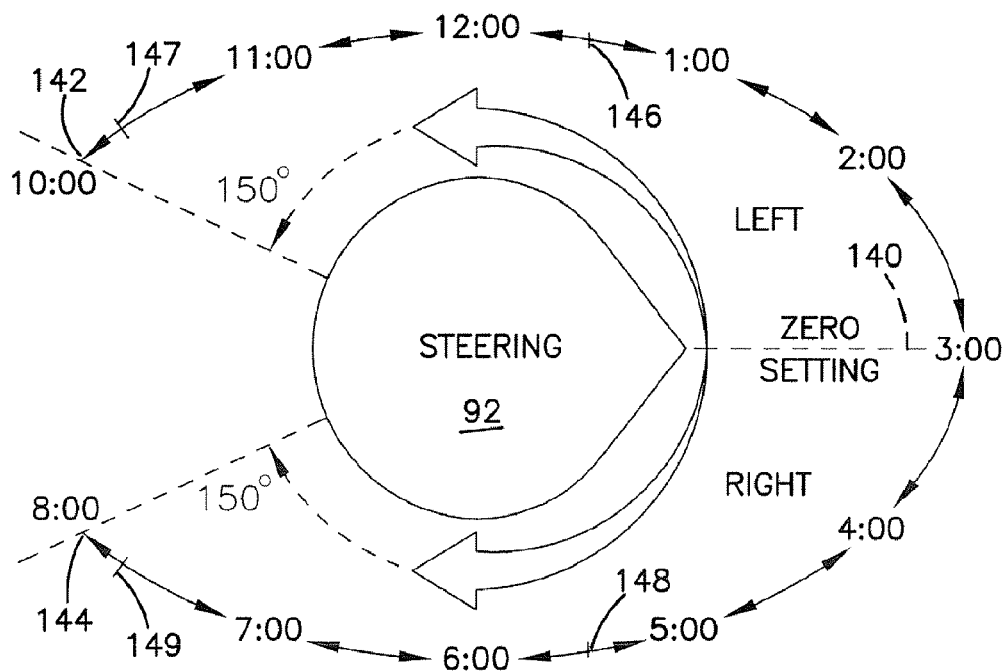
FIG. 9 is a graphical illustration of the multi-mode steering control of FIGS. 5 through 7 and its operation in both a transport mode and a trench mode.

The multi-mode steering control 92, shown in FIGS. 7 and 9, is operable in a plurality of steering modes, with the characteristics of a particular steering mode being preferably alterable by selection of one of a plurality of operating modes as set by the operating mode selector switch 94. Optionally, the steering control characteristics may be additionally modified by the propel motor range selector switch 96 and control system software menu settings. In one embodiment, the steering control 92 is a rotary control comprising a potentiometer, and having a neutral or zero setting 140 (see FIG. 9) and a range of left and right steering settings including a maximum left setting 142 and a maximum right setting 144. In another embodiment, the steering control 92 comprises a steering wheel having substantially the same settings. The steering control 92 can preferably be rotated through 150 degrees of left steering settings and 150 degrees of right steering settings with respect to the zero setting 140. In yet another embodiment, the steering control 92 is a rotary position sensor. Alternatively, the steering control 92 can have other ranges of rotation. The magnitude of left and right turning is preferably proportional to the degree to which the steering control 92 is rotated from the zero setting 140 in the left and right directions, respectively.

Figure 10:
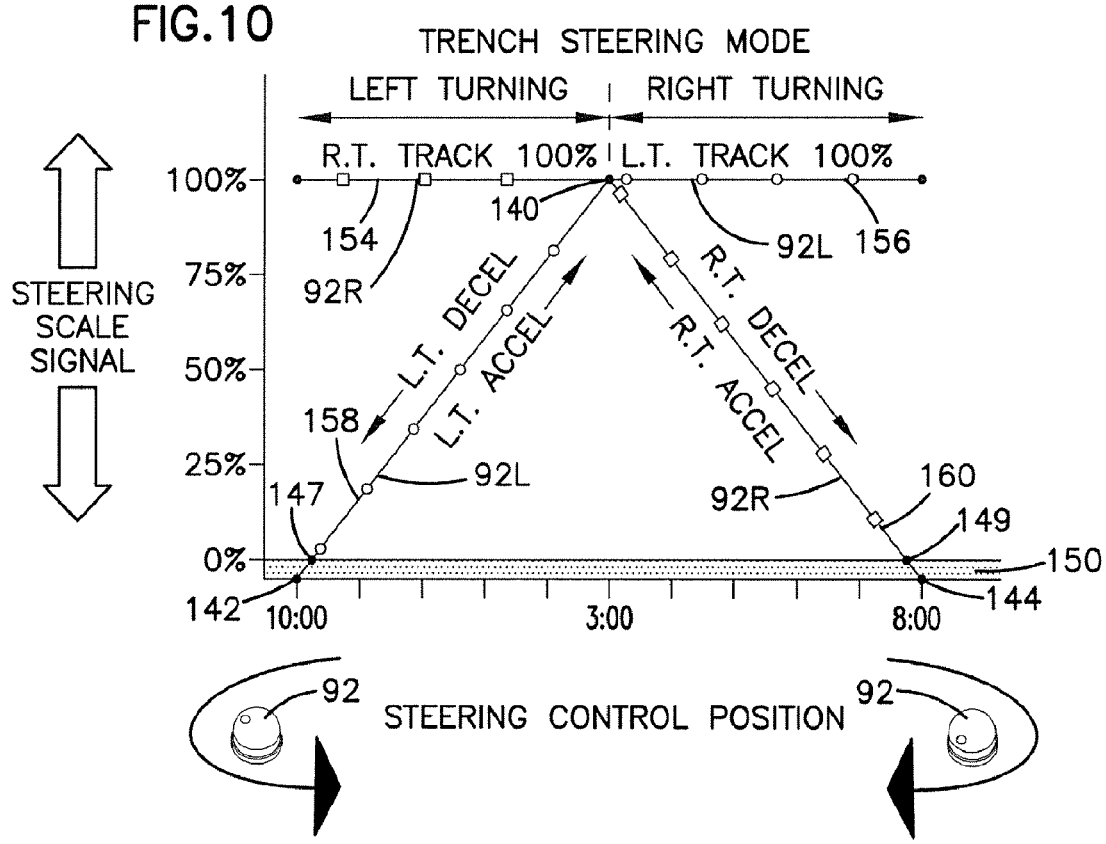
FIG. 10 is a graph illustrating left and right track drive steering characteristics of the track trencher operating in one of the trench modes when the multi-mode steering control of FIGS. 5, 6, 7, and 9 is employed.
Figure 11:
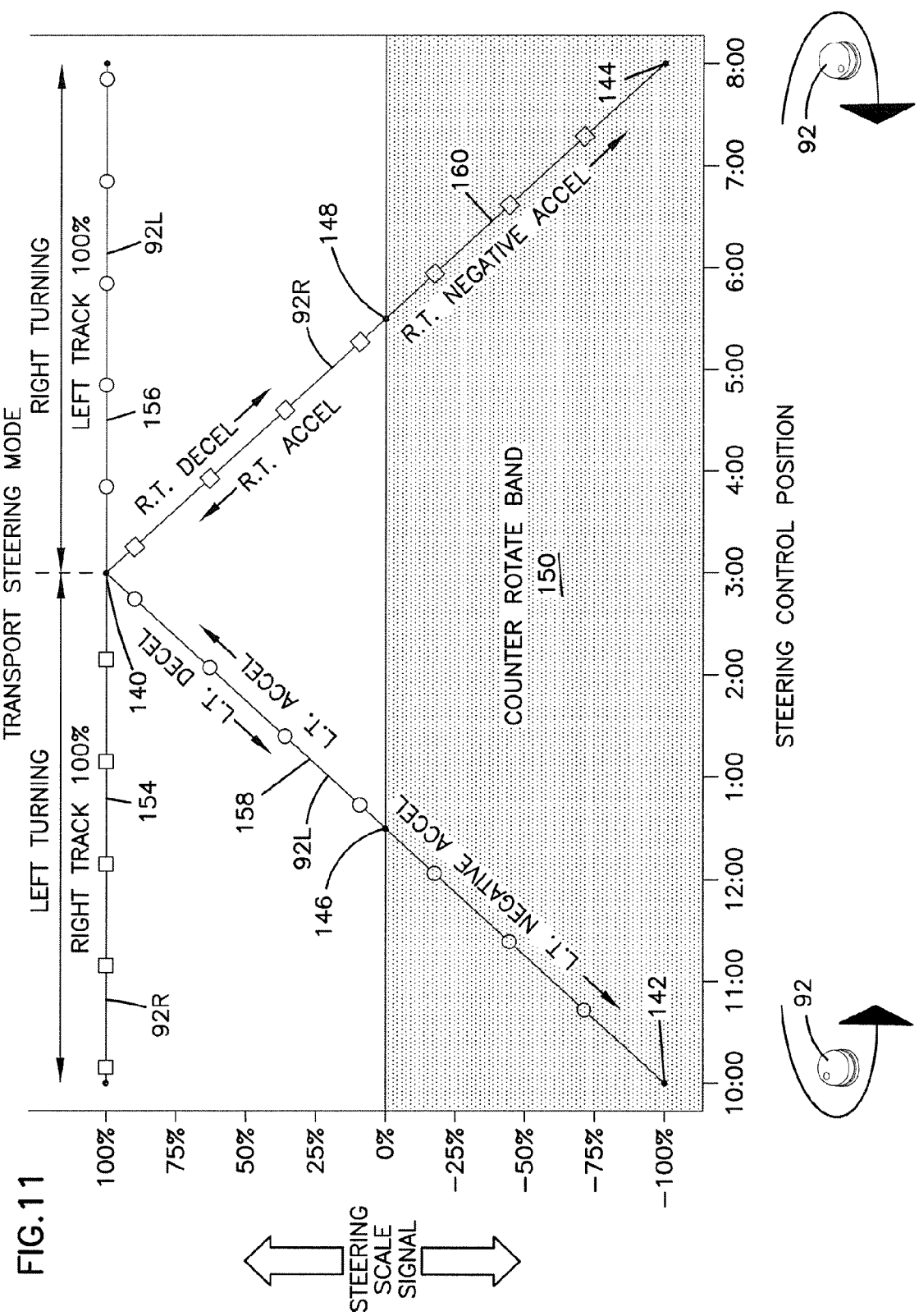
FIG. 11 is a graph illustrating left and right track drive steering characteristics of the track trencher operating in the transport mode when the multi-mode steering control of FIGS. 5, 6, 7, and 9 is employed.

The steering control 92 controls the steering of the track trencher 30 preferably by decreasing the velocity of only one track drive 34 or 32 relative to the other track drive 32 or 34. In one embodiment of the present invention, this decreasing velocity reaches zero at a respective right or left steering position 149 or 147 while in one of the trench modes. Steering to the maximum right or left positions 144 or 142 results in decreasing the velocity to slightly below zero (a negative velocity) as illustrated in FIG. 10. This slight negative velocity allows the respective track drive 34 or 32 to resist being dragged forward by the opposite track drive 32 or 34. While steering in the transport mode, the decreasing velocity reaches a zero point 148 and a zero point 146 about midway through the respective right and left steering ranges. A steering setting beyond this midpoint 148 or 146 reverses the direction of the respective right or left track drive 34 or 32 and increases the velocity in the reverse direction. A maximum reverse velocity is reached at the respective right 144 or left 142 steering extremes that is equal in magnitude to the velocity of the opposite track as illustrated in FIG. 11. A counter-rotate band 150 is formed on FIGS. 10 and 11 in the areas that the track drives 32 and 34 are moving in the opposite direction.

In one embodiment of the present invention, the goal of decreasing the velocity of only one track drive 32 or 34 relative to the other track drive 34 or 32 while steering is achieved by generating a left track drive steering scale signal 92L that is separate from a right track drive steering scale signal 92R. Furthermore, the characteristics of the steering signals 92L and 92R are altered by the operating mode selector switch 94 as illustrated in FIGS. 10 and 11.

Regardless of the operating mode, steering the track trencher 30 in a right direction is accomplished by turning the steering control 92 from the zero setting 140 in a right direction toward the maximum right steering setting 144. As the steering control 92 is turned in the right direction, the left track drive 32 steering scale 92L is maintained at 100%, as indicated by lines 156 in FIGS. 10 and 11, while the right track drive 34 steering scale 92R is reduced, as indicated by lines 160. Similarly, steering the track trencher 30 in a left direction is accomplished by turning the steering control 92 in the left direction. A maximum left turn, for example, is characterized by the right track drive 34 steering scale 92R being maintained at 100%, as indicated by lines 154, while the left track drive 32 steering scale 92L is reduced to slightly below 0% in the trench modes and to −100% in the transport mode, as indicated at points 142 on lines 158.

While the relationships between the steering control 92 position and the steering scale signals 92R and 92L are shown piece-wise linear in FIGS. 10 and 11, other embodiments of the present invention may employ non-linear relationships.

Figure 12:
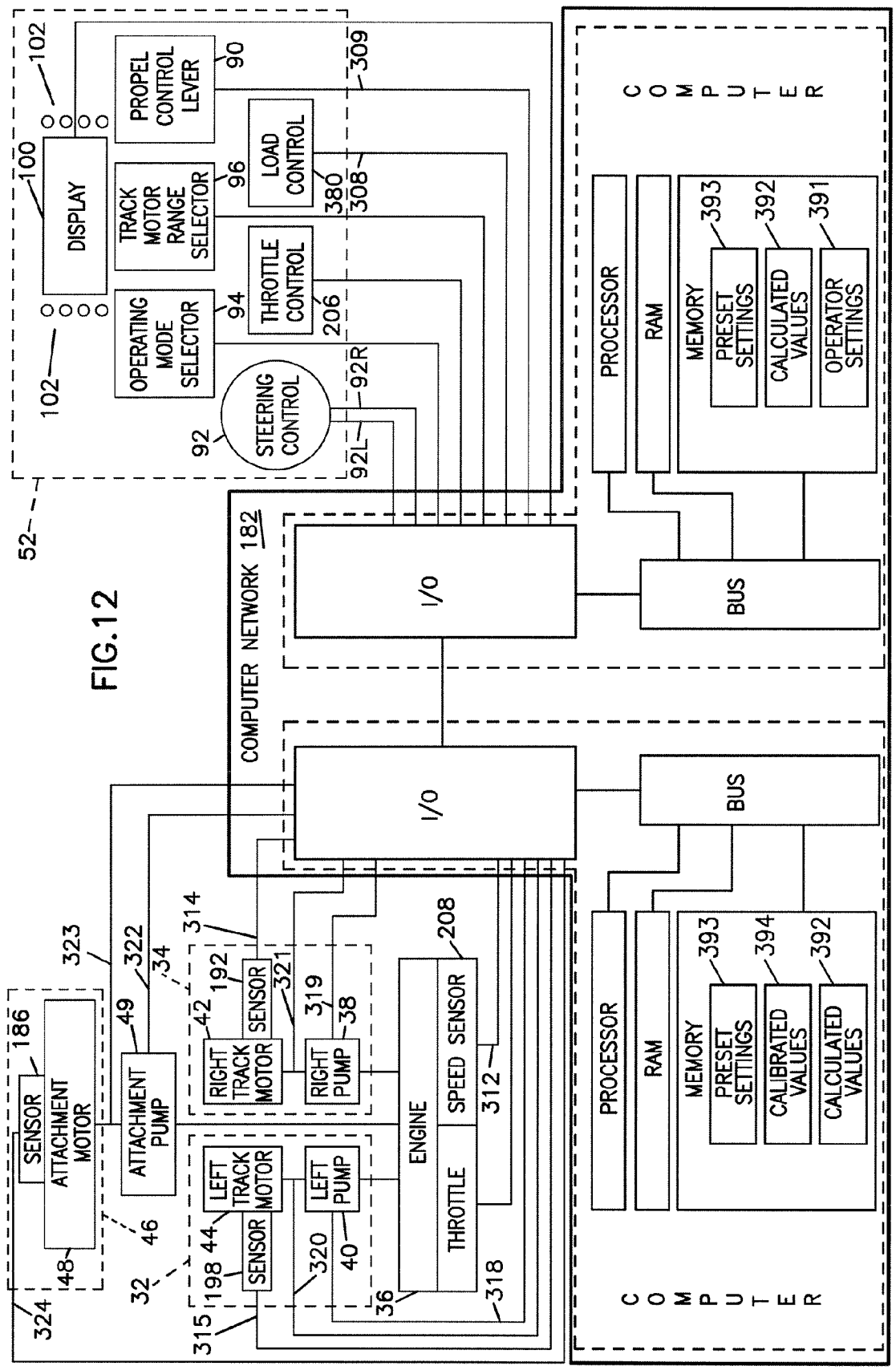
FIG. 12 is a block diagram illustrating a computer network for controlling propulsion and steering of the track trencher employing the multi-mode propel and steering controls, the load control knob, the operating mode selector switch, the track motor range selection switch, and the display with menu navigation and selection buttons.

Referring to FIG. 12, the left track drive 32 typically comprises a left track pump 40 coupled to a left track motor 44, and the right track drive 34 typically comprises a right track pump 38 coupled to a right track motor 42. A left and a right track motor speed sensor 198 and 192 are preferably coupled to the left and right track drive motors 44 and 42, respectively. The left and right track drive pumps 40 and 38, deriving power from an engine 36, preferably regulate hydraulic oil flow to the left and right track motors 44 and 42 in response to a left track pump drive signal 318 and a right track pump drive signal 319 respectively. This, in turn, provides propulsion for the left and right track drives 32 and 34.

Figure 1:
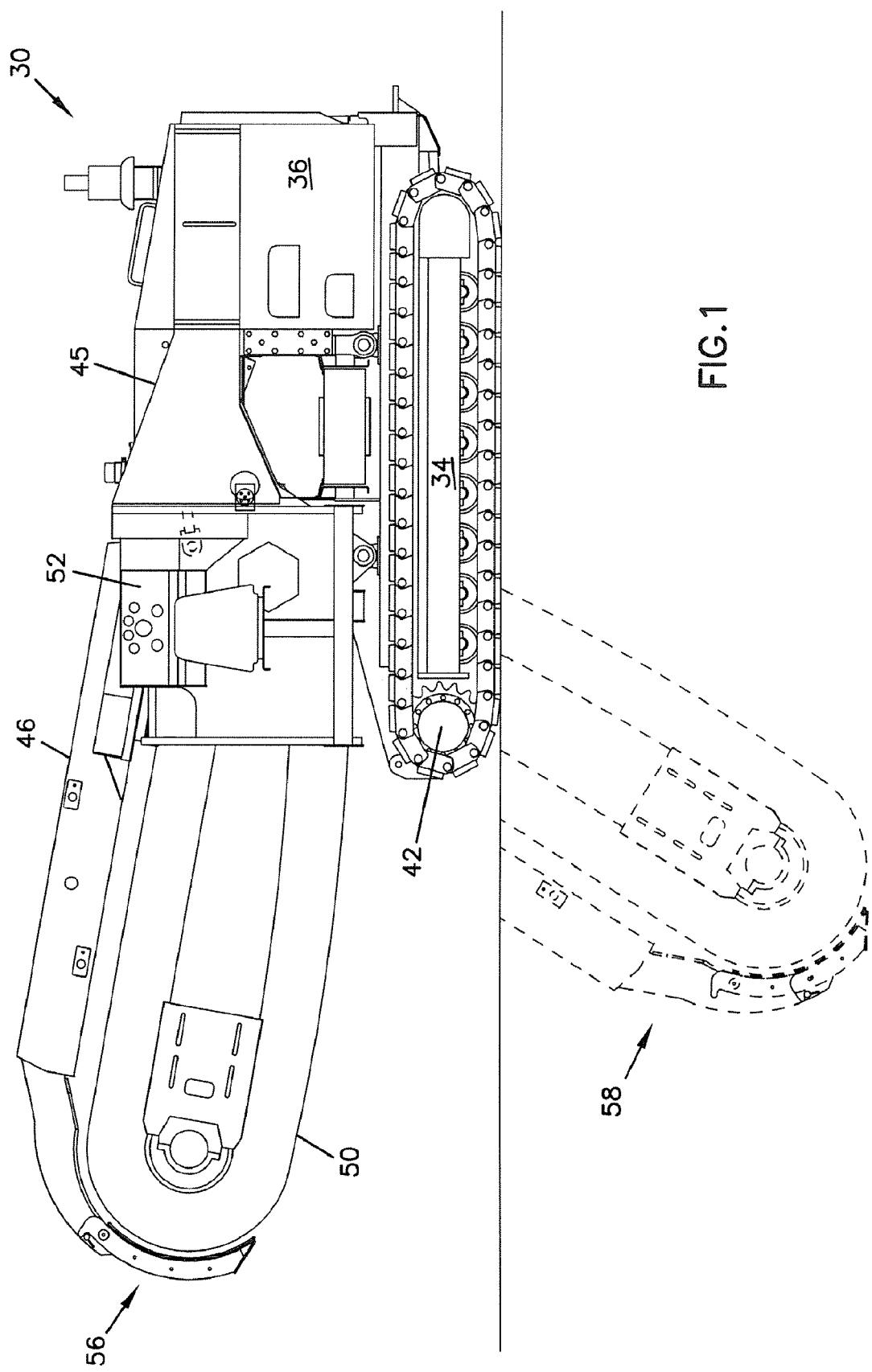
FIG. 1 is a side view of a track trencher, including a ditcher chain trenching attachment.
Figure 2:
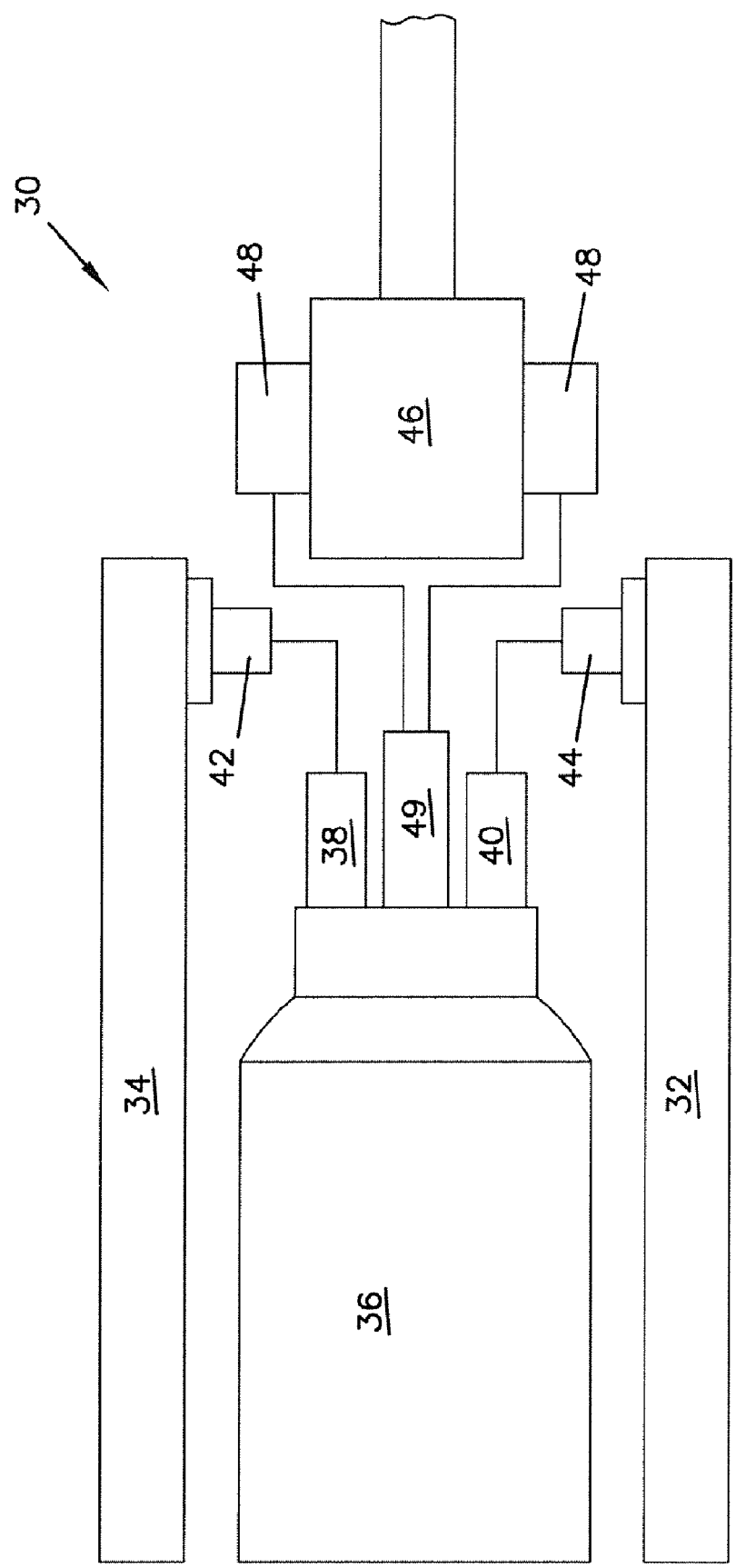
FIG. 2 is a generalized top view of the track trencher, including a right track drive, a left track drive, and an attachment drive.
Figure 3:
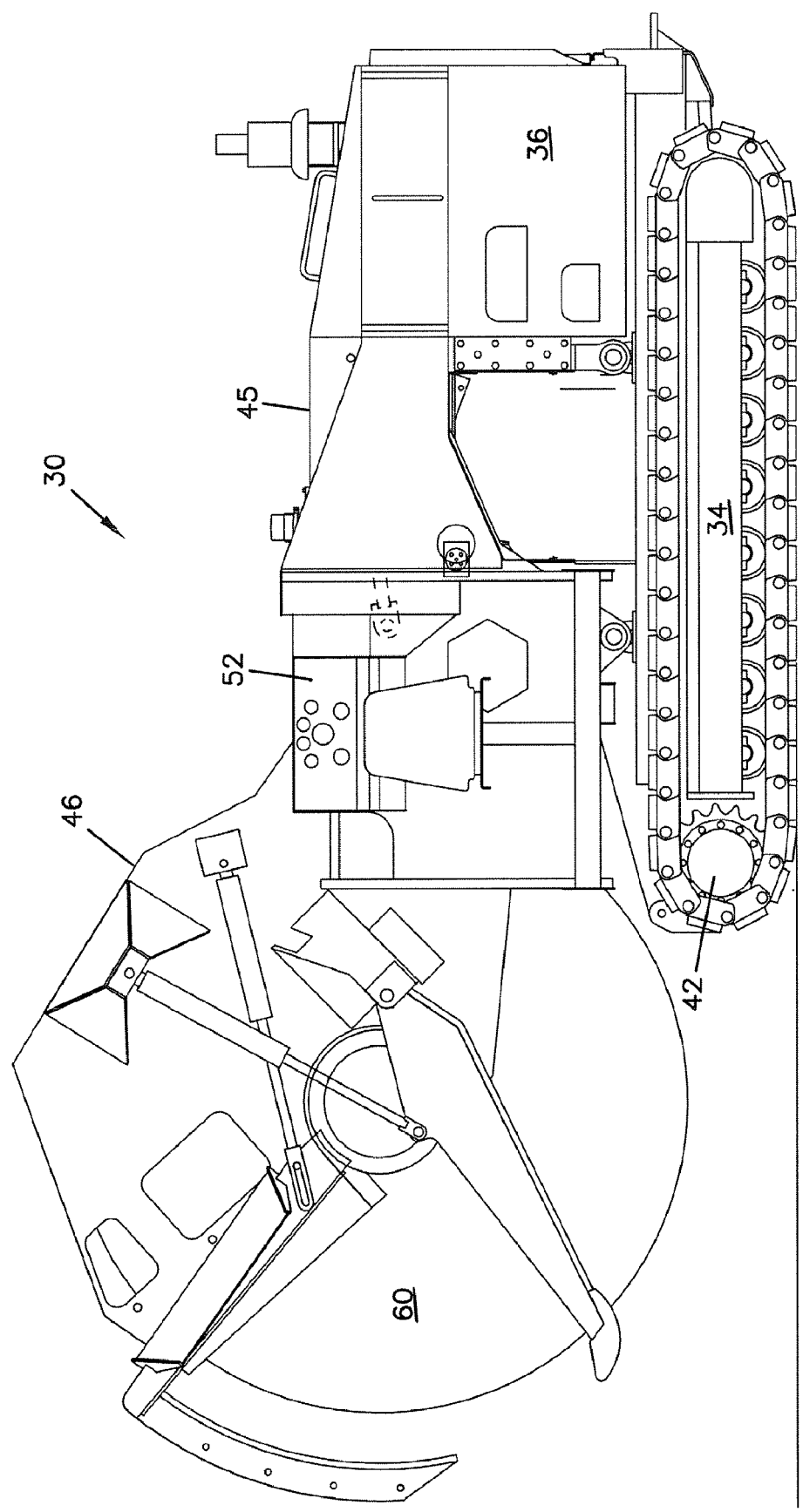
FIG. 3 is a side view of the track trencher with a rock wheel trenching attachment coupled thereto.
Figure 4:
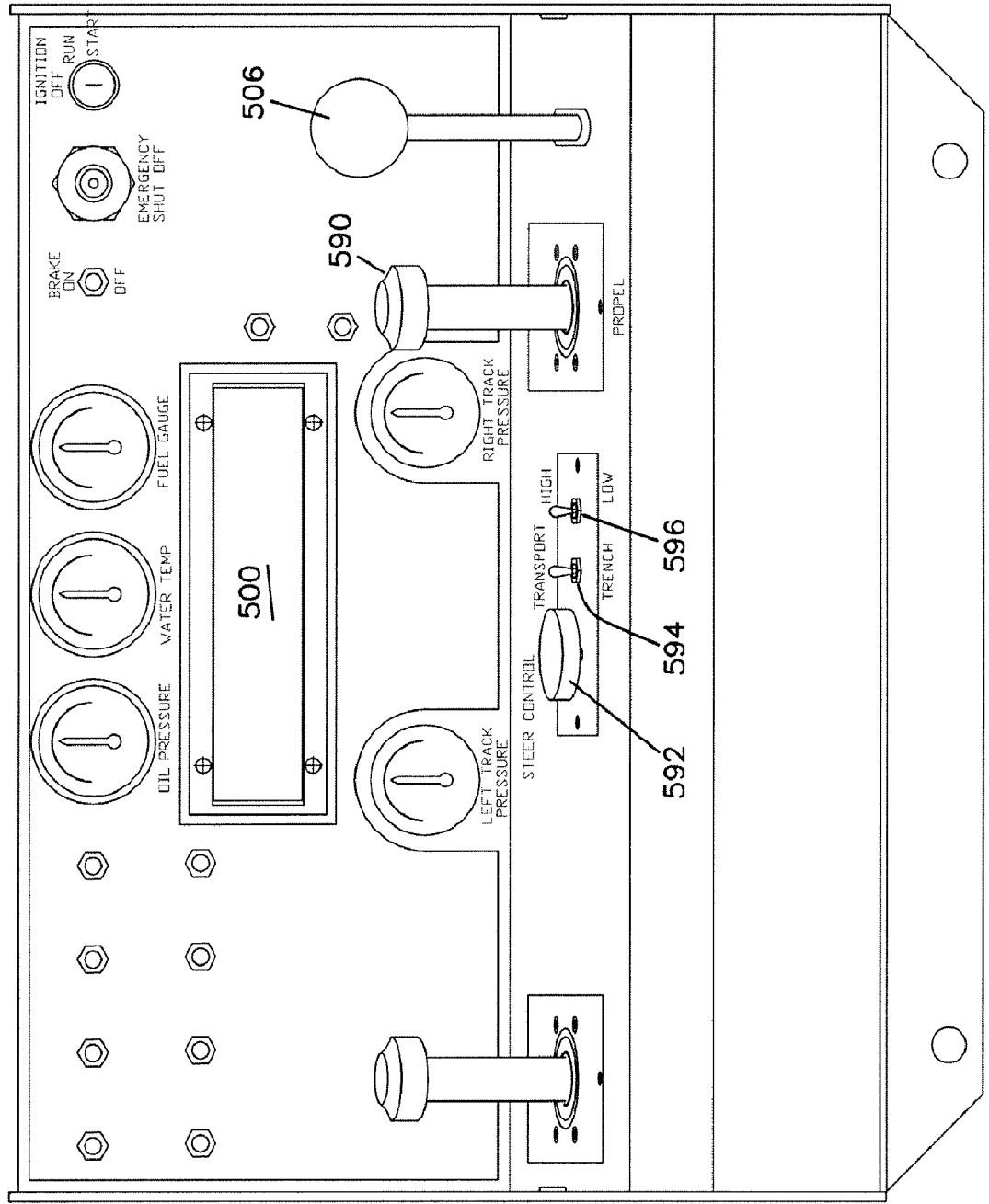
FIG. 4 is a full elevation view of a prior art track trencher control panel incorporating propel, engine throttle, and steering controls and a display.

In a preferred embodiment, an attachment 46 is typically coupled to the rear of a tractor portion 45 of the track trencher 30. Various attachments 46 are known in the art, each specialized to perform a specific type of excavating operation. FIG. 1 illustrates a type of attachment 46 employing a ditcher chain 50, and FIG. 3 illustrates a rock wheel 60 attachment 46. Other attachments 46, such as a TERRAIN LEVELER™, manufactured by Vermeer Manufacturing Company of Pella, Iowa, are also known in the art.

While maneuvering between job sites, the attachment 46 is raised above ground level resulting in a transport configuration 56 of the track trencher 30. To perform excavation, the attachment 46 is lowered into the ground resulting in a trenching configuration 58.

Excavation results when hydraulic power is applied to the attachment 46 and track drives 32 and/or 34 while the track trencher 30 is in the trenching configuration 58. The power induces movement on the active portion of the attachment 46, i.e. the ditcher chain 50 or the rock wheel 60. Optionally mounted to the active portion of the attachment 46 are excavation tools formed of a suitably hard material such as carbide teeth or other cutting implements. The hydraulic power provided to the track drives 32 and/or 34 moves the track trencher 30 therefore driving the subterranean portion of the attachment 46 into unexcavated soil. The active portion of the attachment 46 and tools mounted thereto engage and break up the soil and carry it away from the excavated area.

As shown in FIG. 12, the attachment 46 further comprises an attachment motor 48 preferably deriving power from an attachment pump 49. A speed sensor 186 is preferably coupled to the attachment motor 48 and generates an attachment speed signal 324. The attachment pump 49, deriving power from the engine 36, preferably regulates hydraulic oil flow to the attachment motor 48 which, in turn, provides power for the attachment 46. The attachment pump 49 preferably responds to instructions communicated by an attachment pump drive signal 322 determined by the computer network 182 as illustrated in FIG. 12. Alternatively, the attachment control may operate on the attachment motor 48. One or more attachment motors 48 and one or more attachment pumps 49 may be used together in a parallel hydrostatic circuit.

In certain embodiments of the present invention, actuation of the left track motor 44, right track motor 42, and attachment motor 48 are monitored by speed sensors 198, 192, and 186 respectively. The output signals produced by the sensors 198, 192, and 186 are communicated to the computer network 182. In certain embodiments of the present invention, the operational hydraulic pressure created between the left track motor 44, right track motor 42, and attachment motor 48 and their respective pumps 40, 38, and 49 are monitored by pressure sensors and communicated by a left track hydrostatic drive pressure signal 320, a right track hydrostatic drive pressure signal 321, and an attachment hydrostatic drive pressure signal 323 to the computer network 182.

In a preferred embodiment of the present invention, various signals and settings are used by the control system to accomplish its various goals and functions. For the purposes of this disclosure, these control system variables can be generally classified into seven major categories. These categories may overlap each other and are introduced to organize this disclosure. These and other elements of the present invention could also be classified by other methods and the following classification method should not be interpreted as placing any limitation on the present invention.

In particular, the various signals and settings described below may be used in one or more operational modes. The characteristics of certain signals and settings may be altered depending on the selected operational mode, propel range setting, and other control system software menu settings. The interrelation between the various signals and settings and the characteristics of these signals and settings provides flexibility to the control system and therefore adaptability of the track trencher 30 to various applications.

In certain embodiments, certain of the various signals and settings 391, 392, 393, and 394 are stored in the non-volatile memory within the computer network 182 as illustrated in FIG. 12. Other signals and settings may be represented by an output value from a control lever or knob or a digital signal transmitted by a component such as the engine 36.

The first category of control system signals and settings includes a group of preset settings 393 that are preset at the control system's manufacture. Examples of these preset settings 393 are illustrated in FIG. 12C. These include a maximum engine operating speed 304 in revolutions-per-minute (RPM), a width 305 of a proportional band 330 in RPM, a value(s) 316 of a saturated pump command signal(s) requesting maximum pump displacement(s), a high range full scale drive motor speed 351, a low range full scale drive motor speed 352, and a full scale track drive motor pressure 353. A proportional 340, an integral 341, and a derivative 342 control system error correction factors as well as a time variable 343 and an error limit 344 are also preset. Other embodiments of the present invention may allow for some or all of these values to be set and/or reset at other times.

The second category of signals and settings includes a group of calibrated values 394 derived during a calibration procedure. Examples of these calibrated values 394 are illustrated in FIG. 12D. These include a threshold of movement signal value 302R for the right track pump and a corresponding threshold value 302L for the left track pump. The calibration method to determine these values simply increases the track pump 38 and 40 drive control signals 319 and 318 to each respective pump 38 and 40 until the corresponding motor 42 and 44 moves. The control signal 319 and 318 values which initiate movement are then recorded as the respective threshold values 302R and 302L and stored in the computer network 182.

The third category of signals and settings includes a group of operator settings 391 set by the operator on an occasional basis. Examples of these operator settings 391 are illustrated in FIG. 12A. Additional examples include the operational mode selector switch 94 setting, the track drive motor range selector switch 96 setting, the engine throttle 206 setting, and a load control signal 308 in percent. The load control signal 308 is preferably generated by the load control knob 380 which produces a signal of 0% when rotated fully counter-clockwise, 100% when rotated fully clockwise and proportional values when between these extremes. The operator display 100 and software menu navigation and selection buttons 102 provide access to view and edit various control system menu settings. Alternatively, the display 100 could be touch-screen and/or computer mouse navigated. In a preferred embodiment, the settings editable via the display 100 include a load limit control setting 303 in RPM, a high propel limit setting 306H in percent, a low propel limit setting 306L in percent, a feedback selector setting 325, an attachment pressure feedback control enable setting 326, an attachment pressure proportional band lower boundary 327, and an attachment pressure proportional band upper boundary 328. Various other accessory controls 99 are optionally located on the operator's control console 52. Certain operators and certain trenching techniques may use one or more of these settings on a continuous basis. In certain embodiments, some of these settings may be preset at the control system's manufacture and may not be modifiable by the operator.

The fourth category of signals and settings includes those settings adjusted by the operator on a more frequent or continuous basis. Examples of these include the propel control lever 90 setting and the steering control 92 setting. The propel lever 90 setting generates the propel signal 309 that is 0% at the neutral position 120. Moving the propel control lever 90 forward increases the propel signal 309 until the maximum forward position 122 is reached which results in a propel signal 309 of 100%. Moving the propel control lever 90 in reverse results in the propel signal 309 becoming negative and increasing in magnitude until a maximum reverse position 124 is reached which results in a propel signal 309 of −100%. The steering control 92 setting generates two steering scale signals 92R and 92L in percent according to the graphs in FIGS. 10 and 11 which illustrate the relationship between the steering control 92 position (FIG. 9) and the two signals 92R and 92L. Furthermore, the characteristics of these signals 92R and 92L depend on the operational mode selector switch 94 setting. At position 140 both signals 92R and 92L are 100%. Movement of the steering control 92 in a clockwise direction decreases the right steering scale signal 92R as described above. Similarly, counterclockwise movement from the center position 140 decreases the left steering scale signal 92L as described above. While one of the steering scale signals 92R or 92L is less than 100%, the other steering scale signal 92L or 92R is at 100% as indicated by lines 154 and 156 in FIGS. 10 and 11.

The fifth category of signals and settings includes those signals that indicate a measured physical trencher 30 or environmental condition and/or a trencher 30 response to the control system and environment. Examples of these include an engine speed signal 312 in RPM generated by an engine speed sensor 208. This category also includes a right track drive signal 314 in RPM generated by the right track motor speed sensor 192 and a corresponding left track drive signal 315 in RPM generated by the left track motor speed sensor 198. In addition, this category includes a right track hydrostatic drive pressure 321, a left track hydrostatic drive pressure 320, an attachment drive speed signal 324 in RPM generated by an attachment motor speed sensor 186, an attachment hydrostatic drive pressure 323, and various system and environmental temperatures.

The sixth category of signals and settings includes a group of calculated values 392 calculated by the control system computer network 182 for further use by the control system. Examples of these calculated values 392 are illustrated in FIG. 12B. These include a load multiplier 317, a lower boundary of the load multiplier/engine speed proportional band 310, an upper boundary of the load multiplier/engine speed proportional band 311, an effective attachment drive pressure 346, an attachment correction factor 348, a maximum drive motor speed selection 350, a left track drive motor following error 361, a left track drive motor speed following error 361S, a left track drive motor pressure following error 361P, a right track drive motor following error 362, a right track drive motor speed following error 362S, a right track drive motor pressure following error 362P, an intermediate left PID track drive motor correction 365, an intermediate right PID track drive motor correction 366, an effective left track drive motor following error 363, an effective right track drive motor following error 364, a left track drive motor correction factor 371, a right track drive motor correction factor 372, and an effective attachment correction factor 373.

A seventh category of signals and settings include those signals derived by the control system for control of a system parameter. Examples of these signals include the left track pump drive signal 318 and the right track pump drive signal 319. For certain optional control system modes and configurations, this category may include the attachment pump drive signal 322. It is anticipated that an alternate trencher 30 configuration may employ various motors which can be controlled with a signal. In this case, various drive signals in this category may be derived by the control system and communicated to the motors.

The control system input signals and settings described above may be generated by an operator selection of a discrete physical switch setting (e.g., the mode selector switch 94), an operator selection of a continuous physical control setting (e.g., the propel lever 90 setting), or an operator selection of a discrete or continuous setting via the operator display 100 and menu buttons 102 (e.g. the load limit control setting 303). The method of accessing and changing these setting as described above may be reconfigured between physical and virtual control system access points without departing from the true spirit of the present invention.

The control system of the present invention includes provisions to enable the track trencher 30 operator to select the operational mode deemed most appropriate for the present conditions. In a currently preferred embodiment of the present invention, this selection is accomplished by four inputs from the operator. The first is setting the operating mode selector switch 94 to the "High Trench", "Low Trench", or "Transport" setting. The second input is setting the track motor range selector switch 96 to the "High Range" or "Low Range" setting. The third input is setting the track drive feedback selector 325 to "Track Speed" or "Track Pressure". The fourth input is setting the attachment pressure feedback control enabled setting 326 to "On" or "Off". The various operating modes are useful and appropriate under different conditions. Described below are general characteristics and guidelines for each mode.

Figure 22:
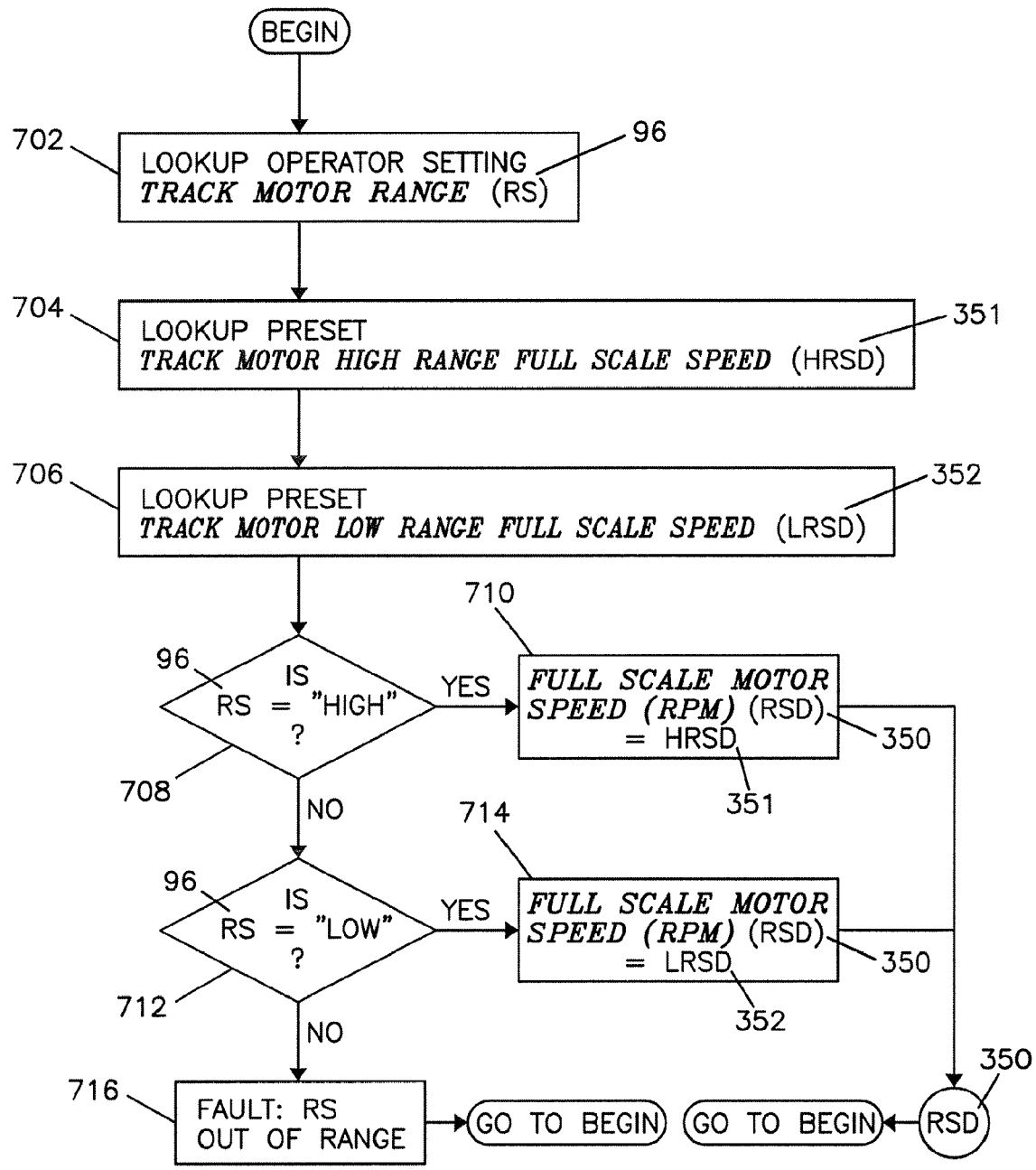
FIG. 22 illustrates a control process for determining and selecting an appropriate track motor control parameter given the current track motor range selection switch setting.

In regards to the track motor range switch 96 setting, the "High Range" selection allows the operator to select a higher potential track speed at the expense of significantly reduced tractive effort capability. Conversely, the "Low Range" selection provides higher tractive effort capability but at a significantly lower potential speed. Either selection can be made independent of the mode switch 94, track feedback 325, and attachment pressure feedback 326 selections. The selection configures the track drive hydraulic motors 42 and 44 appropriately and sets the maximum drive motor speed setting 350 for further use by the control system as shown in FIG. 22. Both transport and trenching operations may be accomplished in "High Range" and "Low Range". However, most trenching conditions are suited for "Low Range".

In regards to the feedback selector setting 325, the "Track Speed" setting configures the control system to form a first PID loop based on the left track drive motor speed signal 315 and a second PID loop based on the right track drive motor speed signal 314. Similarly, the "Track Pressure" setting configures the control system to form a first PID loop based on the left track drive operational pressure signal 320 and a second PID loop based on the right track drive operational pressure signal 321. In a preferred embodiment, the feedback selector setting 325 is effective when the operating mode selector switch 94 is set to the "High Trench" or "Transport" settings.

Figure 20:
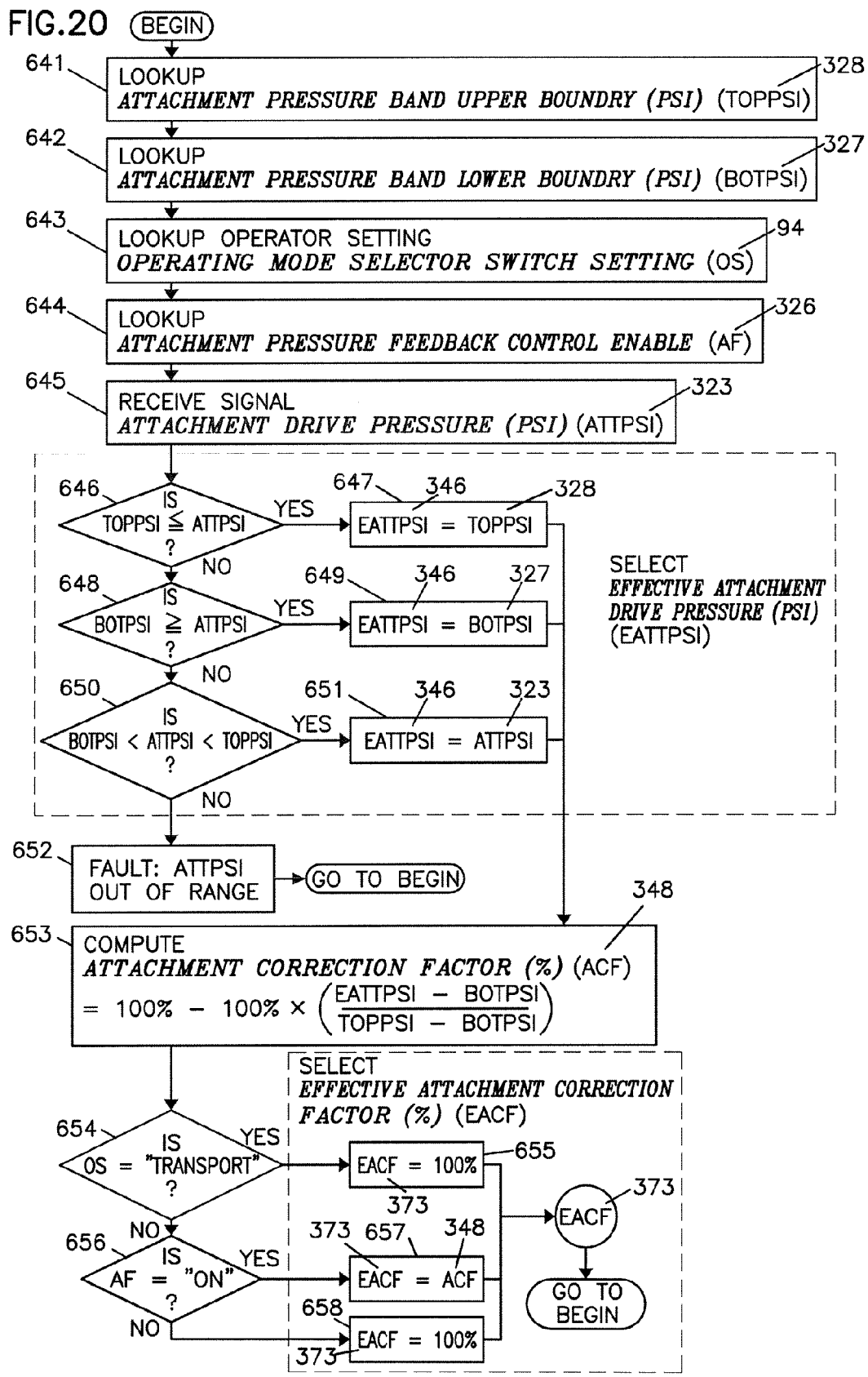
FIG. 20 illustrates a control process for calculating an attachment pressure feedback correction given current input parameters including an attachment pressure feedback control enable setting.

In regards to the attachment pressure feedback control enabled setting 326, selecting "On" configures the control system to form a control loop based on the attachment drive operational pressure signal 323. In a preferred embodiment, this setting 326 is effective when the operating mode selector switch 94 is set to the "High Trench" or "Low Trench" settings. The attachment pressure feedback scale factor 373 is calculated and the function is illustrated in FIG. 20.

In a preferred embodiment, the operating mode selector switch 94 setting "Low Trench" configures the control system to operate with engine speed feedback as further illustrated in FIGS. 18 through 21. The "High Trench" setting configures the control system to operate with both engine speed feedback and PID loop feedback (as selected by the feedback selector 325 setting) as further illustrated in FIGS. 18 through 20 and 22 through 27. The "Transport" setting configures the control system to operate with PID loop feedback (as selected by the feedback selector 325 setting) as further illustrated in FIGS. 22 through 26 and 28.

The various combinations of settings for the operating mode selector switch 94, the track motor range selector switch 96, the feedback selector setting 325, and the attachment pressure feedback control enabled setting 326 could be combined into a single operating mode selector having a plurality of relevant settings. Furthermore, the functional characteristics of each combination of settings could be remapped to other switches and settings that the typical operator finds intuitive.

The appropriate operating mode selector switch 94 setting, feedback selector 325 setting, and attachment pressure feedback control enable setting 326 depends on the operating environment and the material being excavated. For example, in certain conditions, where the material being excavated is hard, selecting "High Trench"/"Track Pressure"/"Attachment Pressure Feedback—Off" will have advantages over "High Trench"/"Track Speed"/"Attachment Pressure Feedback—Off". This advantage is derived from a targeted pressure being applied and consistently regulating the force against the material being excavated. In another example, where track footing is firm and the excavated material is soft, "High Trench"/"Track Speed"/"Attachment Pressure Feedback—Off" will have advantages derived from a regulated track trencher 30 speed. In yet another example, where the excavated material is non-uniform, "High Trench"/"Track Pressure"/"Attachment Pressure Feedback—On" provides advantages in that a consistent excavating effort is maintained. In a final example where the excavated material is exceptionally hard, "Low Trench"/"N/A"/"Attachment Pressure Feedback—On" may provide the best performance using only engine 36 speed and attachment pressure 323 feedback. In certain cases, the best setting combination will be discovered by trial. Commonly, the goal is maximizing production in terms of the trenching speed. This goal is often related to the size of the excavated pieces being removed by the trencher. The production of excessively small pieces may indicate that excessive energy was spent in fracturing the excavated material. Often, switching to a different mode will improve this. Manipulating certain operator adjustable parameters as described below can also be used to tune and/or optimize the operating characteristics of the track trencher 30 to better match the requirements of a particular job.

Referring now to the figures to facilitate an in-depth discussion, and more particularly to FIGS. 5 through 28, there is shown a multi-mode control system for use with the track trencher 30.

Figure 13:
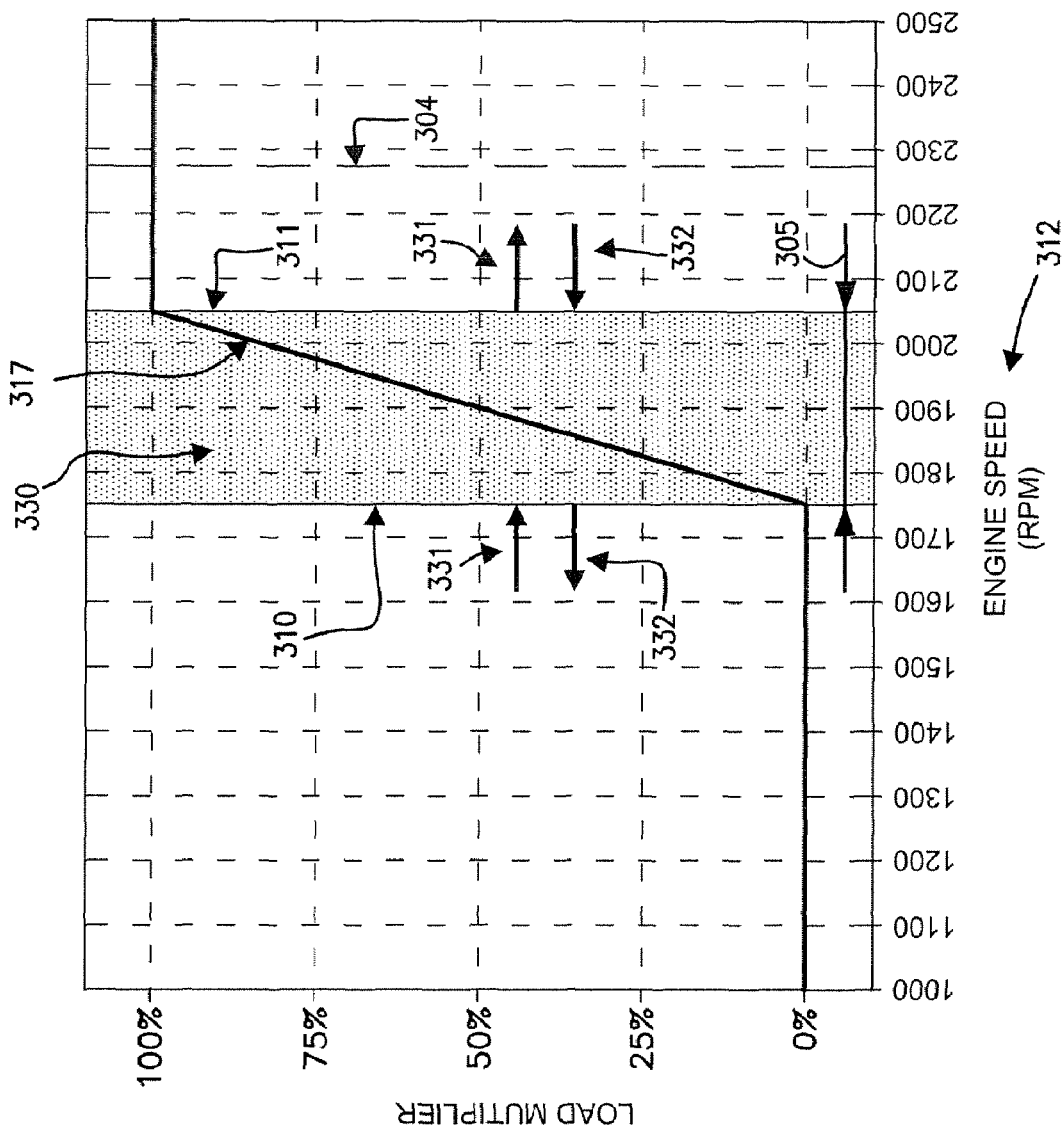
FIG. 13 graphs a load multiplier vs. an engine speed at a particular setting and illustrates a modifiable load multiplier/engine speed proportional band with an upper boundary and a lower boundary.
Figure 14:
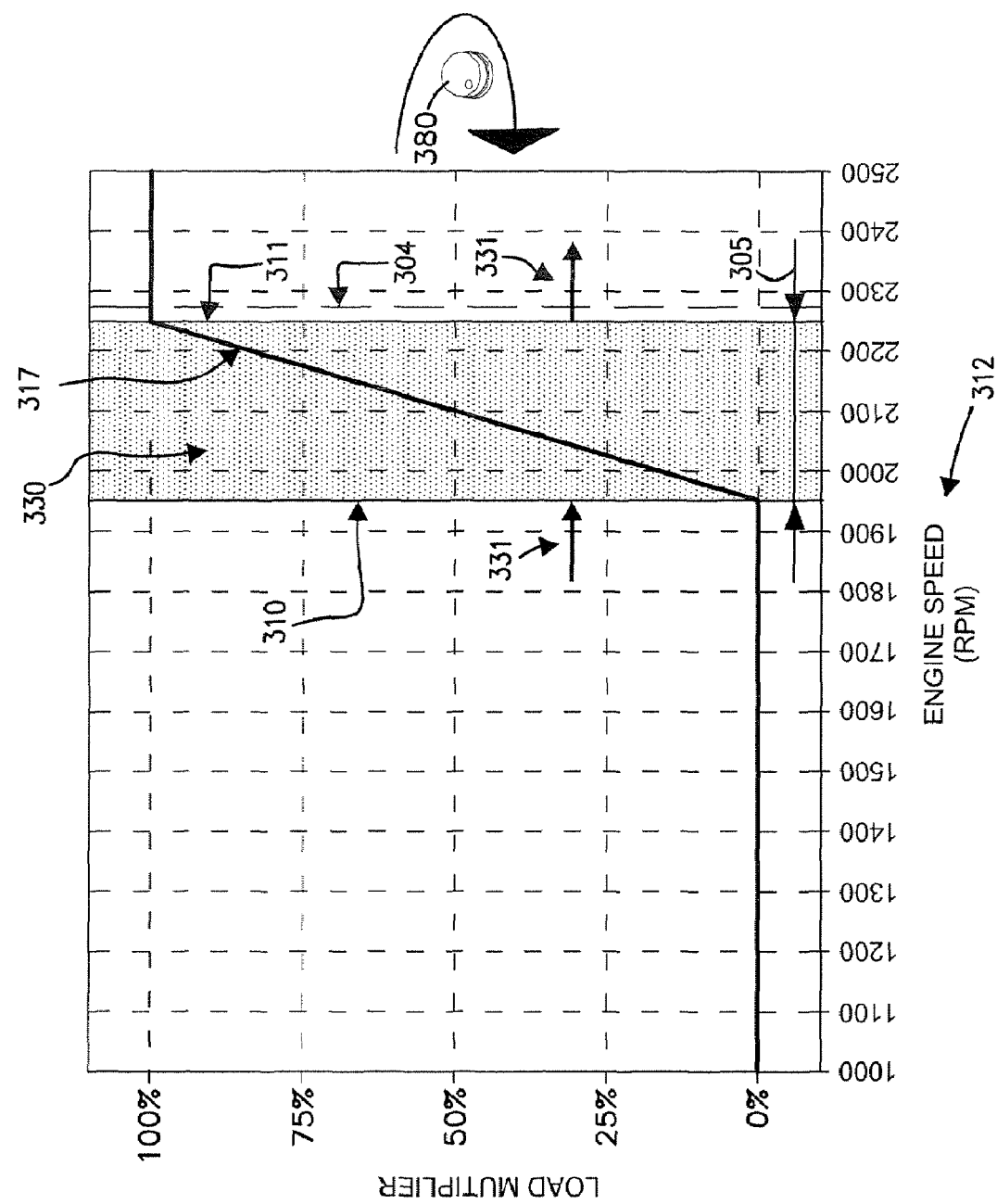
FIG. 14 illustrates the modifiable proportional band and graph of FIG. 13 where the location of the band has been increased by turning the load control knob clockwise.
Figure 15:
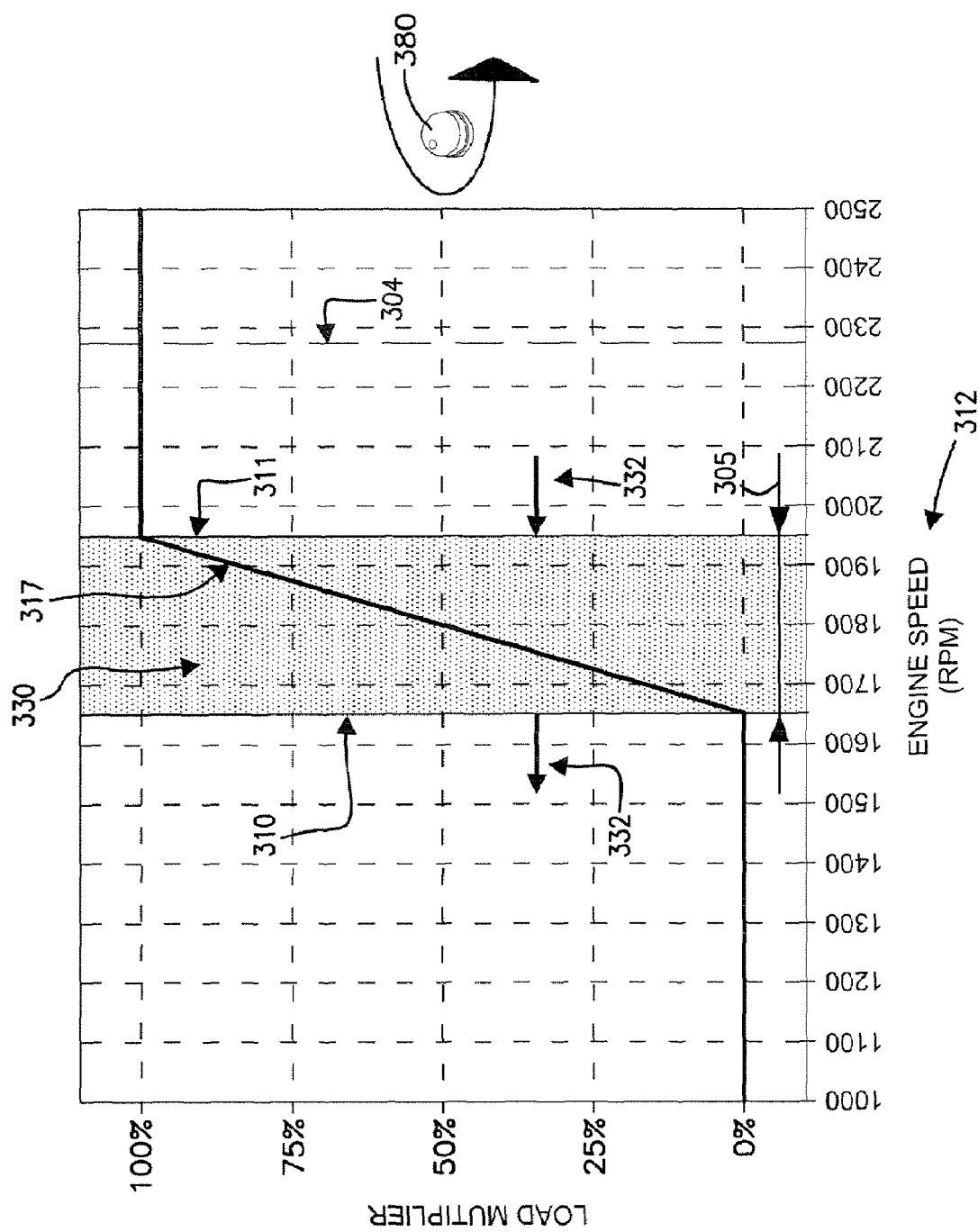
FIG. 15 illustrates the modifiable proportional band and graph of FIG. 13 where the location of the band has been decreased by turning the load control knob counter-clockwise.

FIGS. 13 through 15 illustrate a modifiable proportional band 330 wherein the relationship between the engine speed 312 and the load multiplier 317 is proportional. The operator may choose and later modify the location of the proportional band 330 by either increasing 331 or decreasing 332 it by use of the load control knob 380. As illustrated in FIG. 14, a clockwise movement of the load control knob 380 increases 331 the position of the proportional band 330. Conversely, a counter-clockwise movement of the load control 380 decreases 332 the position as illustrated in FIG. 15. The specific location may be set according to operator preference and/or the current trenching environment. The proportional band 330, as shown in FIGS. 13 through 15 and calculated in FIGS. 18 and 19 describes a linear proportional relationship. In other embodiments of the present invention, other non-linear functional relationships may be utilized and other elements, such as damping, included.

Figure 16:
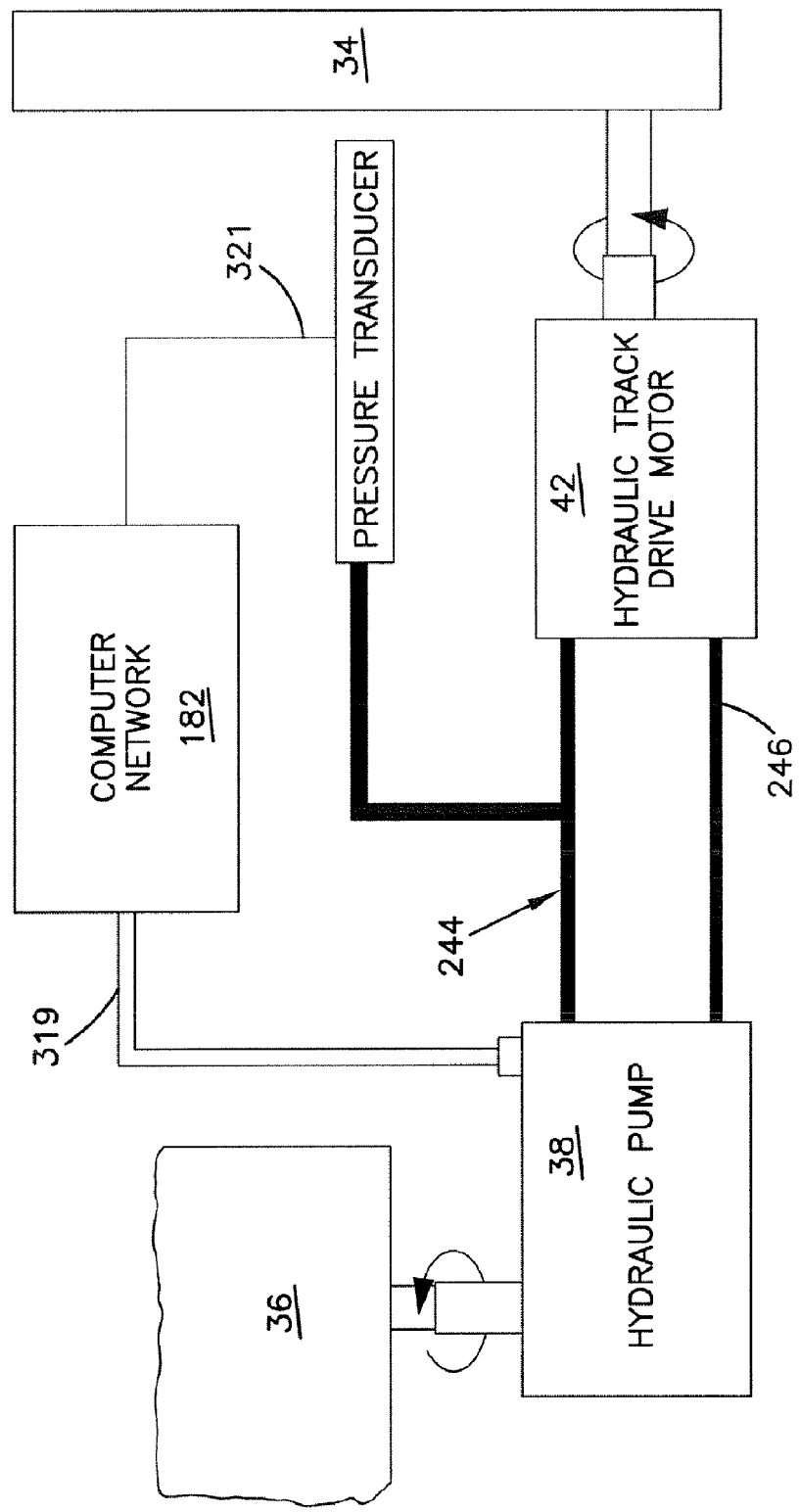
FIG. 16 is a generalized view of the right track drive employing a pressure feedback control.

FIG. 16 illustrates a control loop which monitors the track drive pressures 321 and 320 (as approximated by the pressure within an operational high pressure line 244 and neglecting the pressure in a return line 246) to determine and apply appropriate track drive pump 38 and 40 control current signals 319 and 318 when operating the track trencher 30 in the track pressure feedback mode (as selected by the feedback selector 325 setting). The amount of hydraulic fluid flow each pump 38 and 40 produces is directly proportional to the control signals 319 and 318 respectively. The goal of this control loop is to maintain a specified amount of pressure 321 and 320 on the track drive motors 42 and 44 regardless of the speed of the track drives 34 and 32. The tractive effort of the track drives 34 and 32 is correlated with, and thus controlled along with, these pressures 321 and 320. In one embodiment, the target pressures 321 and 320 are determined by multiplying the full scale motor pressure 353 by the respective steering scales 92R and 92L, the propel lever scale 309, the load multiplier 317, the attachment pressure feedback scale factor 373, and the high propel limit 306H as further described in FIG. 24. Deviations from these values are reflected in error signals 361P and 362P which the control system attempts to minimize.

Figure 17:
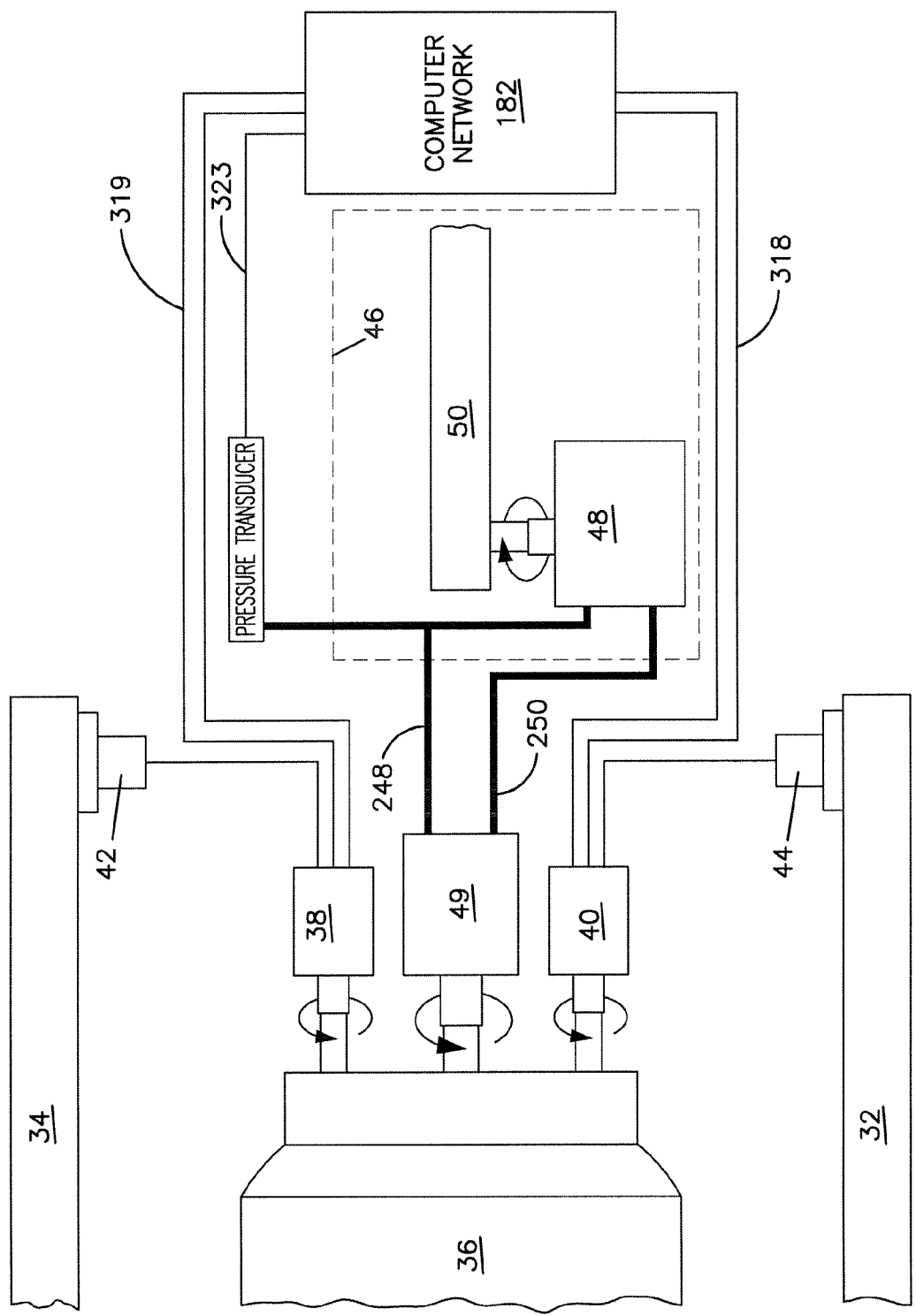
FIG. 17 is a generalized view of the attachment drive with a pressure signal communicated to the computer network thereby employing an attachment pressure feedback control to the track drives.
Figure 29:
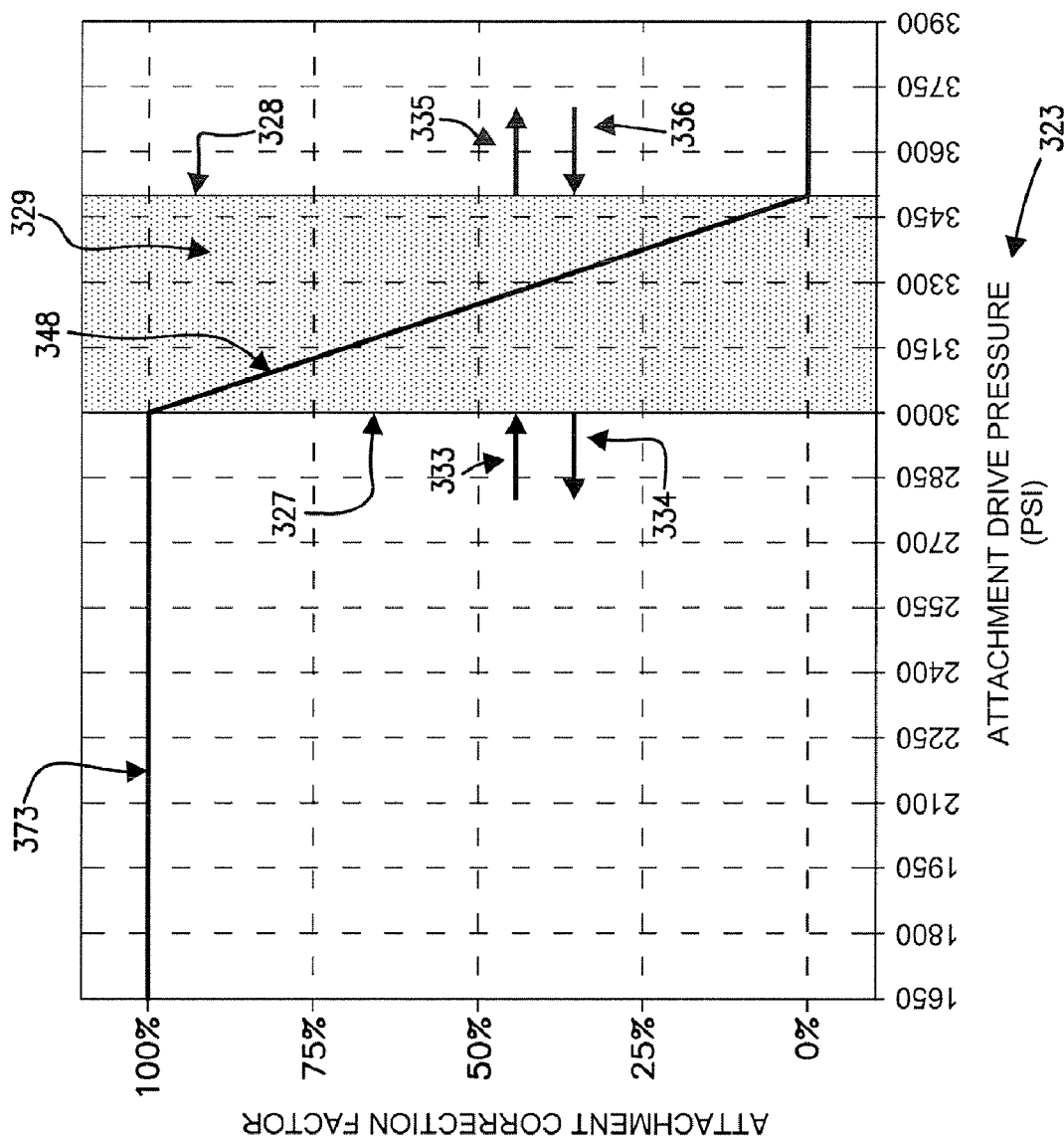
FIG. 29 graphs an attachment correction factor vs. an attachment drive pressure at a particular setting and illustrates a modifiable attachment correction factor/attachment drive pressure proportional band with an upper boundary and a lower boundary.

FIG. 17 illustrates a control loop which monitors the attachment drive pressure 323 (as approximated by the pressure within an operational high pressure line 248 and neglecting the pressure in a return line 250) when operating the track trencher 30 with the attachment pressure feedback control enabled setting 326 set to "On". In particular, the operator sets the attachment pressure proportional band lower and upper boundaries 327 and 328 defining an attachment drive pressure proportional feedback band 329. As further described in FIG. 20 and illustrated in FIG. 29, the current operational attachment drive pressure 323 is compared to the lower and upper boundaries 327 and 328. If less than the lower boundary 327, the attachment correction factor 348 is set to 100% resulting in greater track drive 32 and 34 propulsive effort. If greater than the upper boundary 328, the attachment correction factor is set to 0% resulting in the removal of track drive 32 and 34 propulsive effort. If within the boundaries 327 and 328, the attachment correction factor 348 is calculated as shown in FIG. 20 and is proportional to the drive pressure's 323 position within the band with a value of 100% given at the lower boundary 327 and a value of 0% given at the upper boundary 328. This value is then assigned to the effective attachment correction factor 373 if the operating mode selector switch 94 is not set to "Transport" and the attachment pressure feedback control enabled setting 326 is set to "On". Otherwise, the effective attachment correction factor 373 is set to 100%, effectively disabling the attachment drive pressure feedback. The operator may increase 333 or decrease 334 the position of the lower boundary 327. Likewise, the operator may independently increase 335 or decrease 336 the position of the upper boundary 328. Adjusting the boundaries 327 and 328 of the attachment drive pressure proportional feedback band 329 may be used to further tune and optimize the track trencher 30 for a particular job. In the example embodiment illustrated above, a linear relationship is described between the attachment correction factor 348 and the attachment drive pressure 323. In other embodiments, non-linear relationships could be implemented. Also in the example embodiment illustrated above, the operator may adjust the boundaries 327 and 328 of the attachment drive pressure proportional feedback band 329. In other embodiments, the boundaries 327 and 328 may be preset at the control system's manufacture and may not be modifiable by the operator.

FIGS. 18 through 28 describe an embodiment of the present invention in the context of flowcharts which calculate and manipulate various control system variables to control the track drives 32 and 34 in various operating modes. It is anticipated that other algorithms can be devised that result in equivalent relationships between the various variables.

Figure 18:
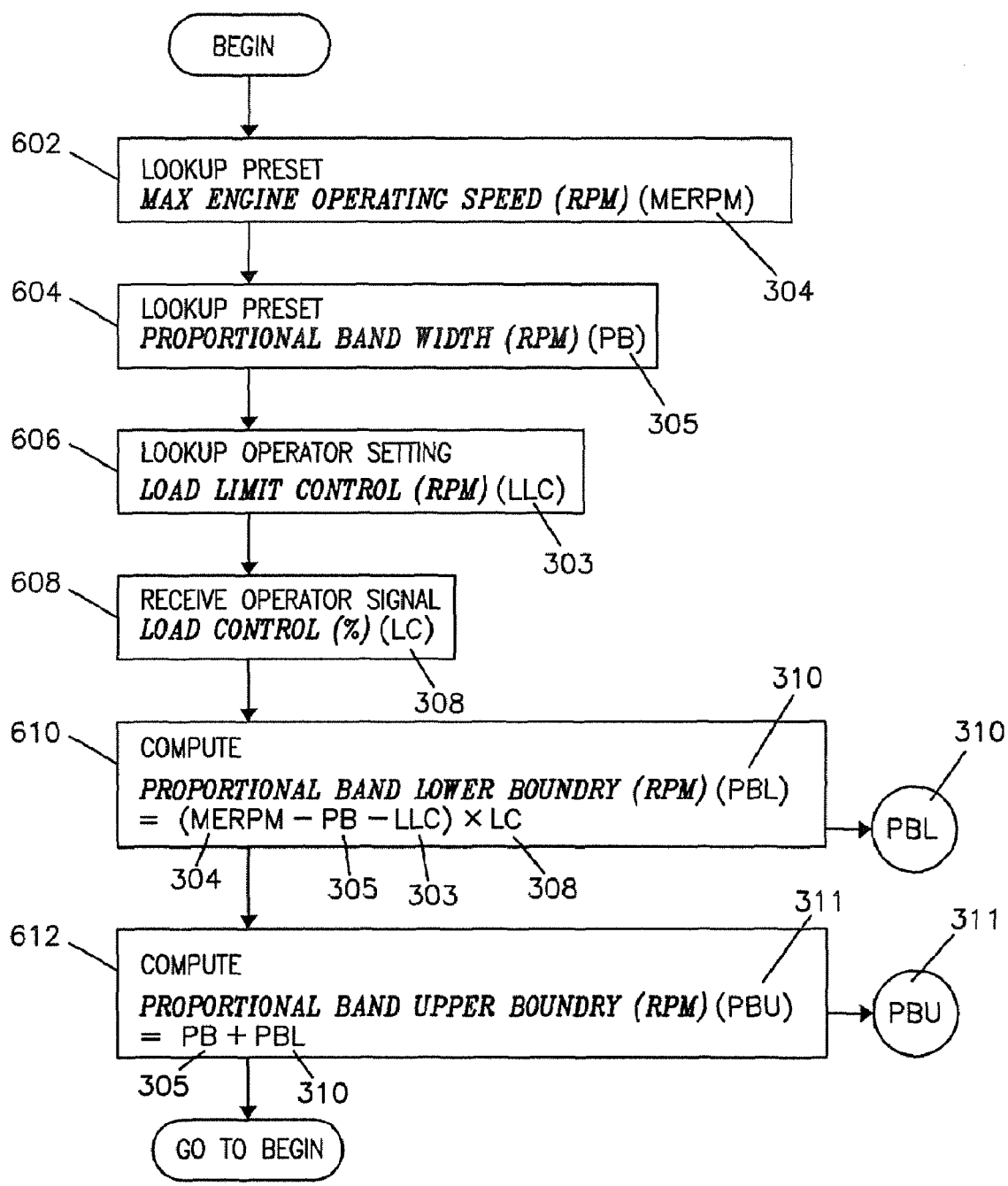
FIG. 18 illustrates a control process for calculating the boundaries of the load multiplier/engine speed proportional band of FIGS. 13 through 15 given current input parameters.

FIG. 18 illustrates a method by which the upper boundary 311 and lower boundary 310 of the proportional band 330 are calculated and stored. Inputs for this method are retrieved in steps 602 through 608 and include the maximum engine operating speed 304 in step 602, the width of the proportional band 305 in step 604, the load limit control setting 303 in step 606, and the load control setting 308 in step 608. The lower boundary 310 is calculated as shown and stored in step 610 and the upper boundary 311 is calculated as shown and stored in step 612. The calculation cycle is then repeated.

Figure 19:
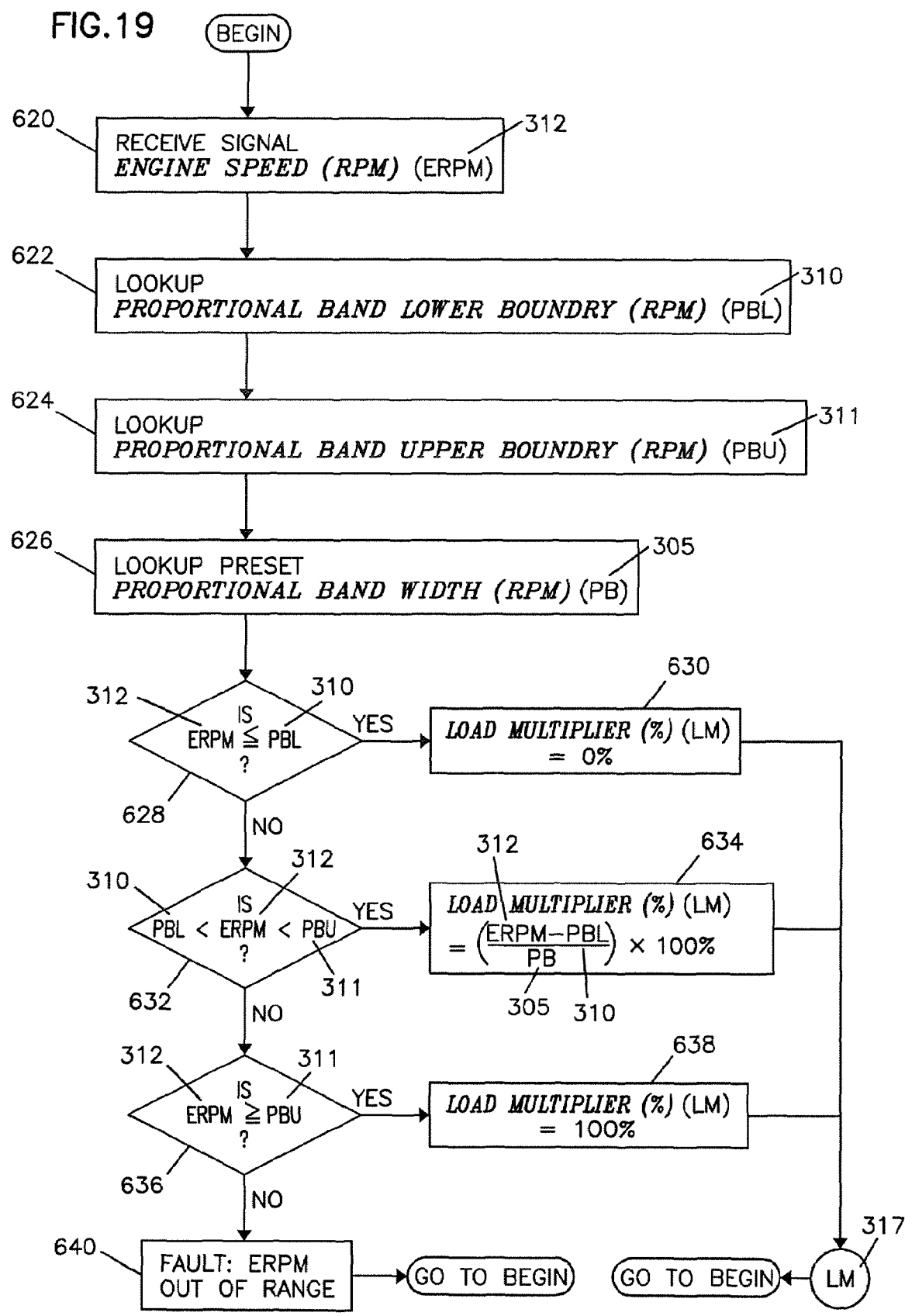
FIG. 19 illustrates a control process for calculating the load multiplier of FIGS. 13 through 15 given current input parameters.

FIG. 19 illustrates a method by which the load multiplier 317 is calculated and stored. Inputs for this method are retrieved in steps 620 through 626 and include the actual engine speed 312 in step 620, the lower boundary 310 in step 622 and upper boundary 311 in step 624 of the proportional band 330, and the width of the proportional band 305 in step 626. The engine speed 312 is tested in step 628 and if found to be less than or equal to the lower boundary 310, then the load multiplier 317 is set to 0% in step 630 and stored. If the result of step 628 is no, the engine speed 312 is tested in step 632. If the engine speed 312 is found to be within the upper boundary 311 and the lower boundary 310, then the load multiplier 317 is calculated as shown in step 634 and stored. If the result of step 632 is no, the engine speed is tested in step 636. If the engine speed 312 is found to be greater than or equal to the upper boundary 311, then the load multiplier is set to 100% in step 638 and stored. If the result of step 636 is no, then an out of range fault is generated in step 640. The calculation cycle is repeated after the load multiplier 317 is stored or after step 640.

FIG. 20 illustrates a method by which the effective attachment correction factor 373 is calculated and stored. Inputs for this method are retrieved in steps 641 through 645 and include the attachment pressure band upper boundary 328 in step 641, the attachment pressure band lower boundary 327 in step 642, the operating mode selector switch setting 94 in step 643, the attachment pressure feedback control enable setting 326 in step 644, and the attachment drive operational pressure 323 in step 645. The operational attachment drive pressure 323 is tested in step 646 and if greater than or equal to the attachment pressure band upper boundary 328 then the effective attachment drive pressure 346 is set to the attachment pressure band upper boundary 328 in step 647 otherwise the attachment drive operational pressure 323 is tested again in step 648. If the attachment drive operational pressure 323 is less than or equal to the attachment pressure band lower boundary 327 then the effective attachment drive pressure 346 is set to the attachment pressure band lower boundary 327 in step 649 otherwise the attachment drive operational pressure 323 is tested again in step 650. If the attachment drive operational pressure 323 is greater than the attachment pressure band lower boundary 327 and less than the attachment pressure band upper boundary 328 then the effective attachment drive pressure 346 is set to the attachment drive operational pressure 323 in step 651 otherwise an out of range fault is generated in step 652 and the calculation cycle is repeated. In step 653 the attachment correction factor 348 is calculated as shown. In step 654 the operating mode selector switch setting 94 is tested and if equal to "Transport" the effective attachment correction factor 373 is set to 100% and stored in step 655 otherwise the attachment pressure feedback control enable setting 326 is tested in step 656. If equal to "On" then the effective attachment correction factor 373 is set equal to the attachment correction factor 348 and stored in step 657 otherwise the effective attachment correction factor 373 is set to 100% and stored in step 658. The calculation cycle is then repeated.

Figure 21:
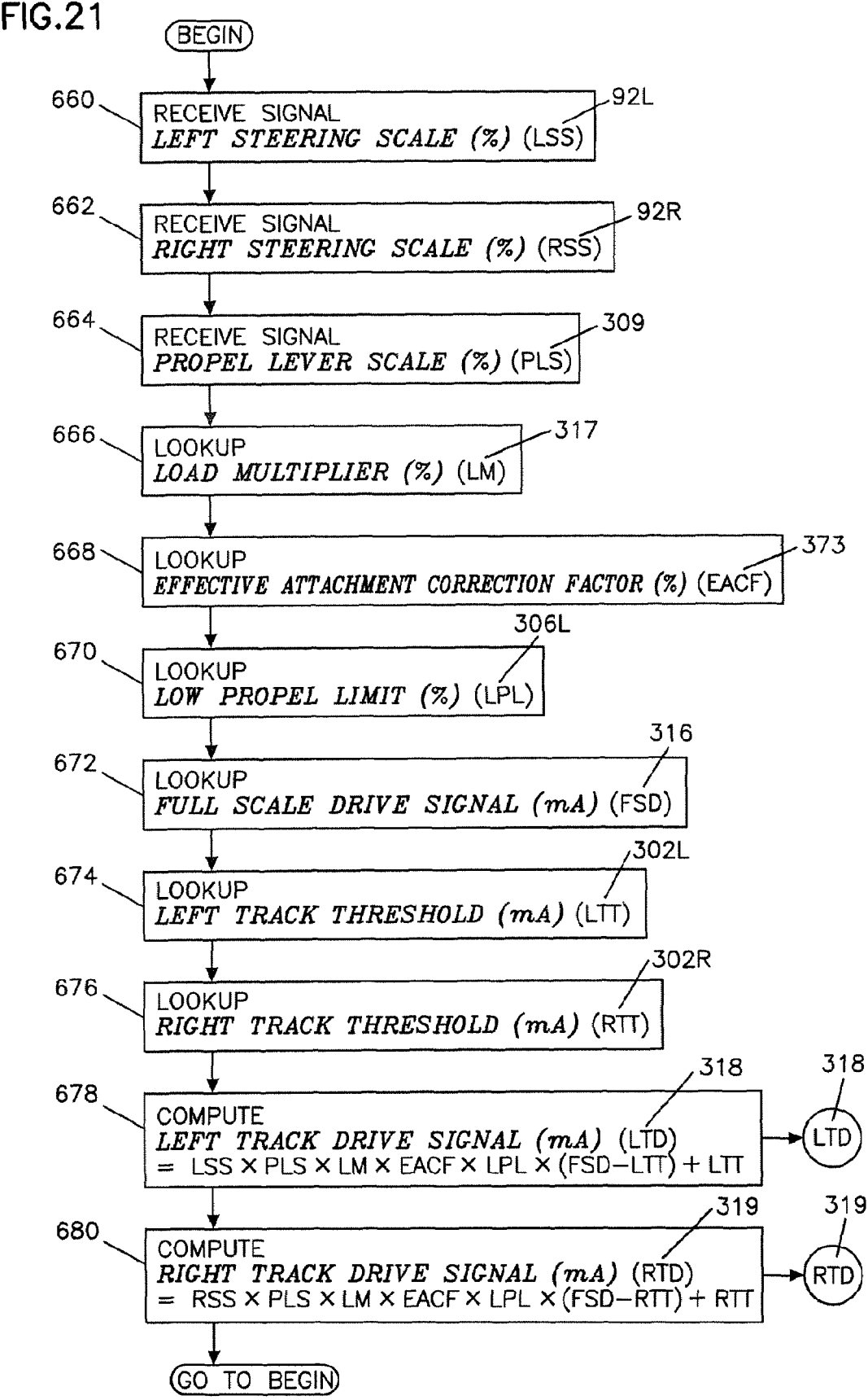
FIG. 21 illustrates a control process for calculating a left track drive signal and a right track drive signal given current input parameters in a low trench mode.

FIG. 21 illustrates a method by which the left track drive signal 318 and right track drive signal 319 are calculated and stored with the control system set to a low trench mode. Inputs for this method are retrieved in steps 660 through 676 and include the left steering scale 92L in step 660, the right steering scale 92R in step 662, the propel lever scale 309 in step 664, the load multiplier 317 in step 666, the effective attachment correction factor 373 in step 668, the low propel limit 306L in step 670, the full scale drive value 316 in step 672, the left track drive threshold 302L in step 674, and the right track drive threshold 302R in step 676. The left track drive signal 318 is calculated as shown and stored in step 678 and the right track drive signal 319 is calculated as shown and stored in step 680. The calculation cycle is then repeated.

FIG. 22 illustrates a method by which the proper maximum drive motor speed value 350 is determined and stored. Inputs for this method are retrieved in steps 702 through 706 and include the track motor range setting 96 in step 702, the high range full scale drive motor speed 351 in step 704, and the low range full scale drive motor speed 352 in step 706. The track motor range 96 is tested in step 708 and if equal to "high", then the maximum drive motor speed value 350 is set to the high range full scale drive motor speed 351 and stored in step 710. If the result of step 708 is no, the track motor range 96 is tested in step 712. If the track motor range 96 is found to be equal to "low", then the maximum drive motor speed value 350 is set to the low range full scale drive motor speed 352 in step 714 and stored. If the result of step 712 is no, then an out of range fault is generated in step 716. The calculation cycle is repeated after the maximum drive motor speed value 350 is stored or after step 716.

Figure 23:
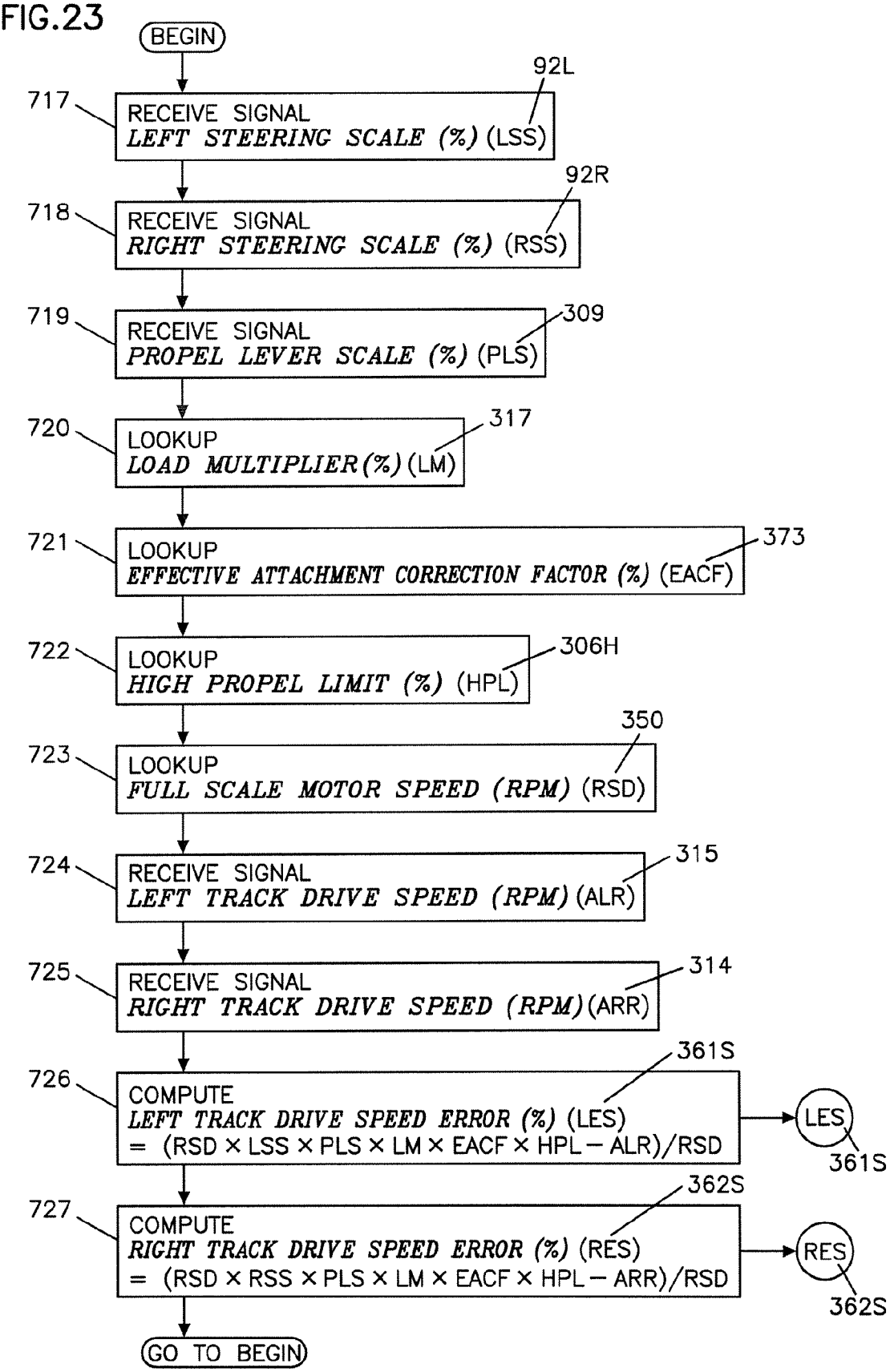
FIG. 23 illustrates a control process for computing a right track drive speed following error and a left track drive speed following error given current input parameters.

FIG. 23 illustrates a method by which the left track drive speed following error 361S and right track drive speed following error 362S are calculated and stored. Inputs for this method are retrieved in steps 717 through 725 and include the left steering scale 92L in step 717, the right steering scale 92R in step 718, the propel lever scale 309 in step 719, the load multiplier 317 in step 720, the effective attachment correction factor 373 in step 721, the high propel limit 306H in step 722, the maximum drive motor speed value 350 in step 723, the left track drive speed 315 in step 724, and the right track drive speed 314 in step 725. The left track drive speed following error 361S is calculated as shown and stored in step 726 and the right track drive speed following error 362S is calculated as shown and stored in step 727. The calculation cycle is then repeated.

Figure 24:
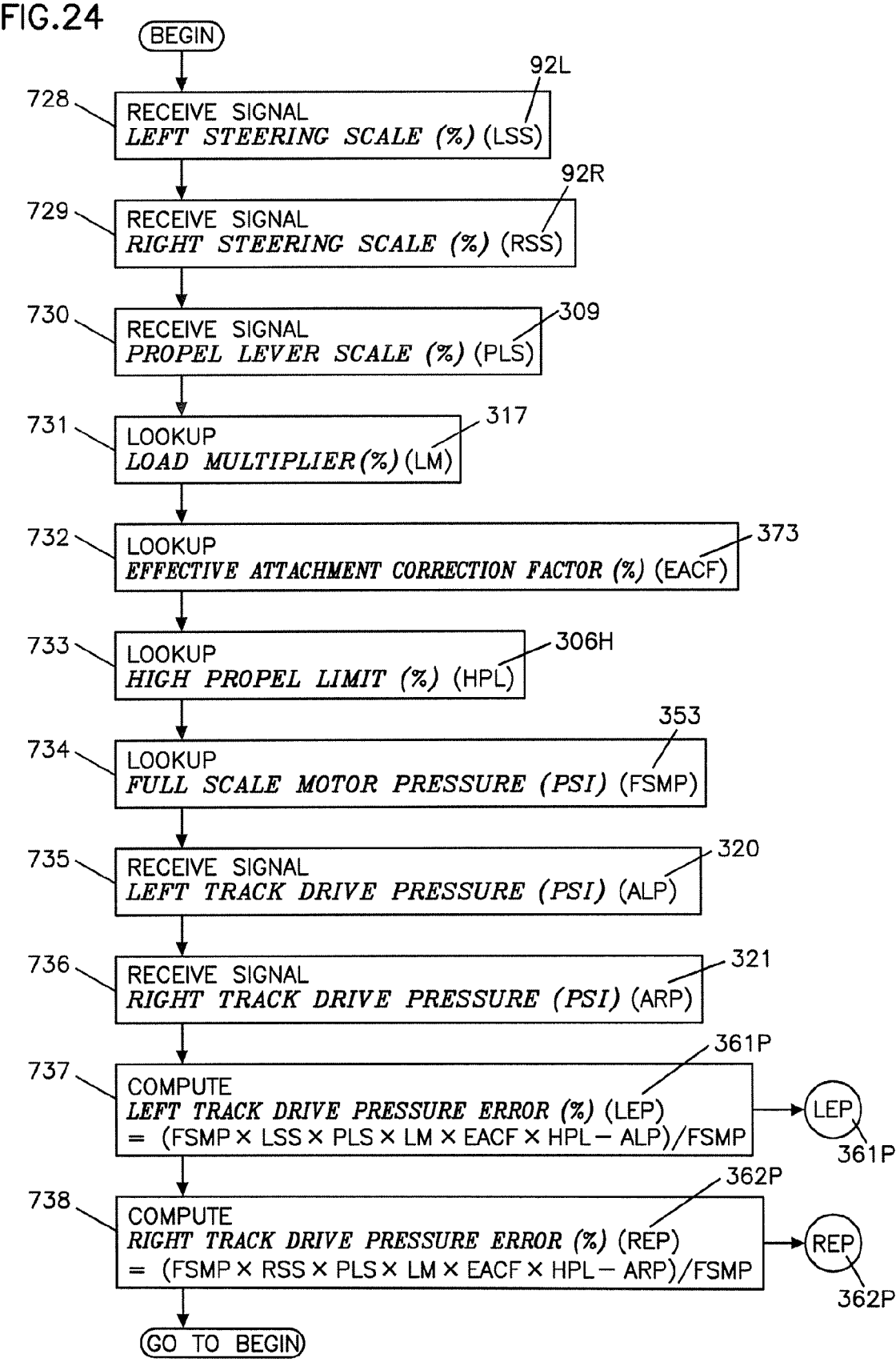
FIG. 24 illustrates a control process for computing a right track drive pressure following error and a left track drive pressure following error given current input parameters.

FIG. 24 illustrates a method by which the left track drive pressure following error 361P and right track drive pressure following error 362P are calculated and stored. Inputs for this method are retrieved in steps 728 through 736 and include the left steering scale 92L in step 728, the right steering scale 92R in step 729, the propel lever scale 309 in step 730, the load multiplier 317 in step 731, the effective attachment correction factor 373 in step 732, the high propel limit 306H in step 733, the full scale track drive motor pressure value 353 in step 734, the left track drive operational pressure 320 in step 735, and the right track drive operational pressure 321 in step 736. The left track drive pressure following error 361P is calculated as shown and stored in step 737 and the right track drive pressure following error 362P is calculated as shown and stored in step 738. The calculation cycle is then repeated.

Figure 25:
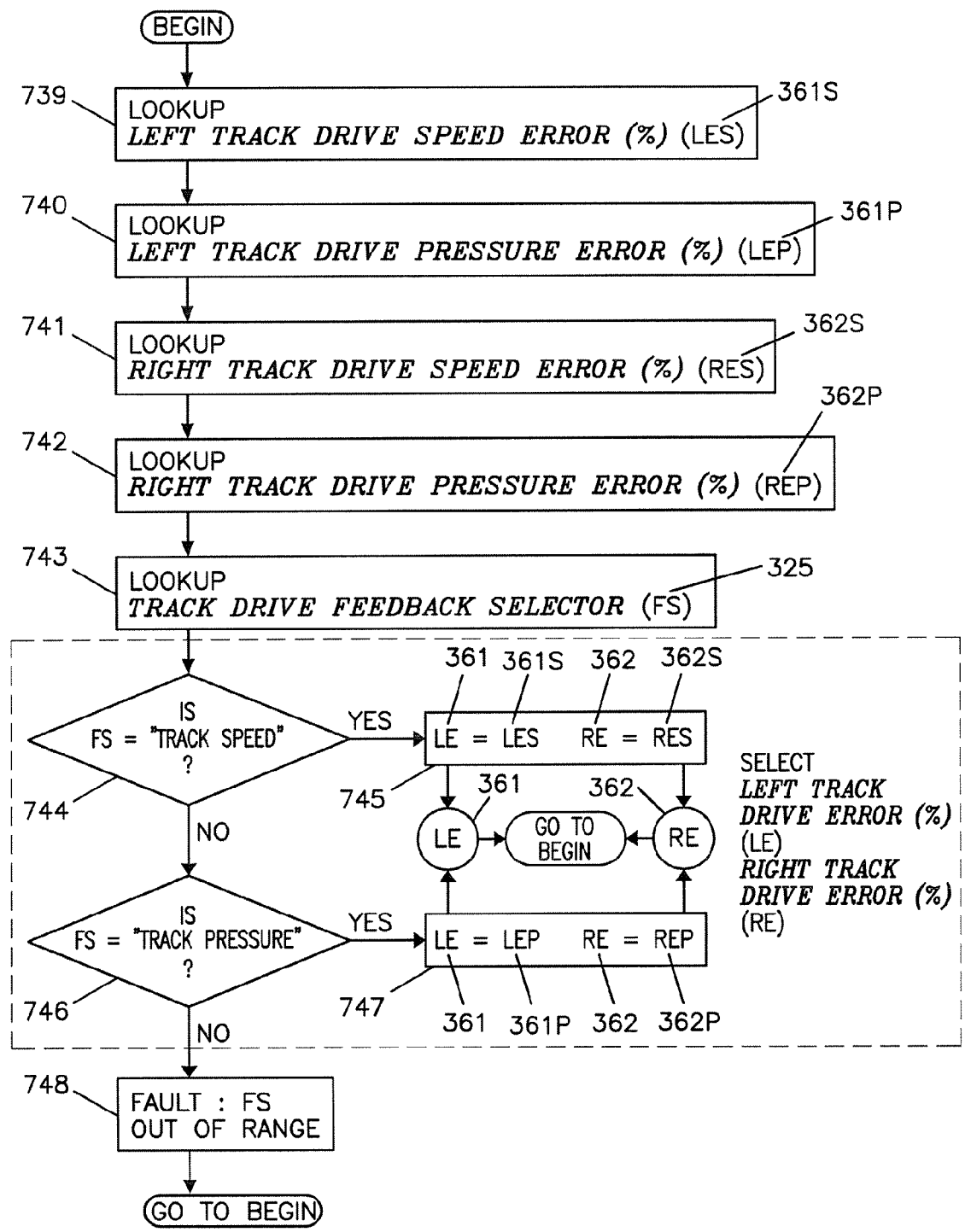
FIG. 25 illustrates a control process for determining and selecting an appropriate right track drive following error and an appropriate left track drive following error given the current setting of a track drive feedback selector.

FIG. 25 illustrates a method by which the left track drive following error 361 and the right track drive following error 362 are selected and stored. Inputs for this method are retrieved in steps 739 through 743 and include the left track drive speed following error 361S in step 739, the left track drive pressure following error 361P in step 740, the right track drive speed following error 362S in step 741, the right track drive pressure following error 362P in step 742, and the track drive feedback selector setting 325 in step 743. The track drive feedback selector setting 325 is tested in step 744 and if equal to "Track Speed" the left track drive following error 361 is set equal to the left track drive speed following error 361S and stored and the right track drive following error 362 is set equal to the right track drive speed following error 362S and stored in step 745 otherwise the track drive feedback selector setting 325 is tested again in step 746. If the track drive feedback selector setting 325 is equal to "Track Pressure" the left track drive following error 361 is set equal to the left track drive pressure following error 361P and stored and the right track drive following error 362 is set equal to the right track drive pressure following error 362P and stored in step 747 otherwise an out of range fault is generated in step 748. The calculation cycle is then repeated.

Figure 26:
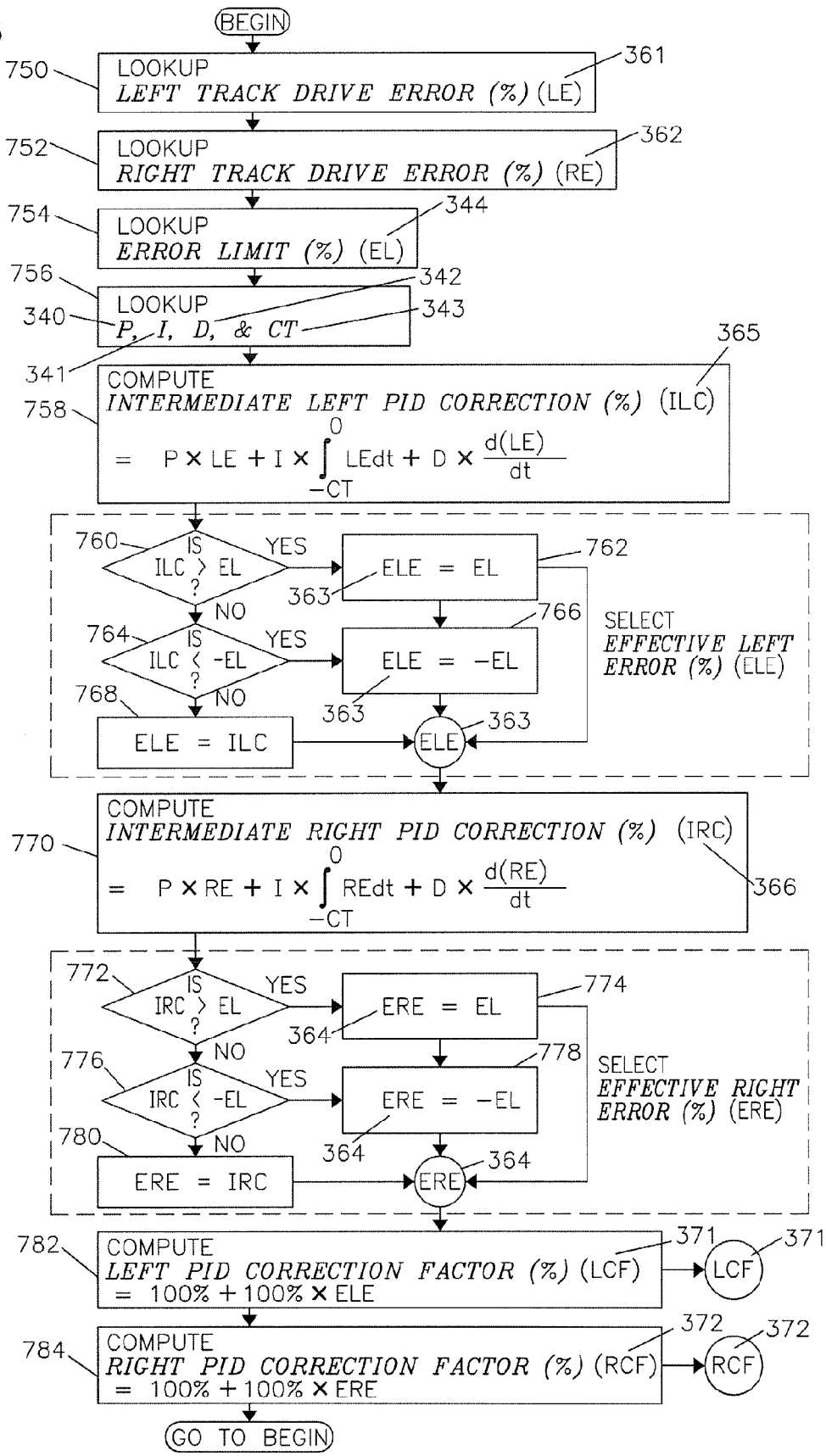
FIG. 26 illustrates a control process for computing a right track drive correction factor and a left track drive correction factor given current input parameters.

FIG. 26 illustrates a method by which the left PID correction factor 371 and the right PID correction factor 372 are calculated and stored. Inputs for this method are retrieved in steps 750 through 756 and include the left track drive error 361 in step 750; the right track drive error 362 in step 752; the error limit 344 in step 754; and the PID loop variables P 340, I 341, D 342, and CT 343 in step 756. The intermediate left PID track drive motor correction 365 is calculated as shown in step 758 and tested in step 760. If the intermediate left PID track drive motor correction 365 is greater than the error limit 344, then the effective left track drive motor following error 363 is set equal to the error limit 344 and stored in step 762 otherwise the intermediate left PID track drive motor correction 365 is tested in step 764. If the intermediate left PID track drive motor correction 365 is less than the negative of the error limit 344, then the effective left track drive motor following error 363 is set equal to the negative of the error limit 344 and stored in step 766 otherwise the effective left track drive motor following error 363 is set equal to the intermediate left PID track drive motor correction 365 and stored in step 768. The calculations are continued in step 770 where the intermediate right PID track drive motor correction 366 is calculated as shown and then tested in step 772. If the intermediate right PID track drive motor correction 366 is greater than the error limit 344, then the effective right track drive motor following error 364 is set equal to the error limit 344 and stored in step 774 otherwise the intermediate right PID track drive motor correction 366 is tested in step 776. If the intermediate right PID track drive motor correction 366 is less than the negative of the error limit 344, then the effective right track drive motor following error 364 is set equal to the negative of the error limit 344 and stored in step 778 otherwise the effective right track drive motor following error 364 is set equal to the intermediate right PID track drive motor correction 366 and stored in step 780. The calculations are continued in step 782 where the left track drive motor correction factor 371 is calculated and stored and in step 784 where the right track drive motor correction factor 372 is calculated and stored. The calculation cycle is then repeated.

Figure 27:
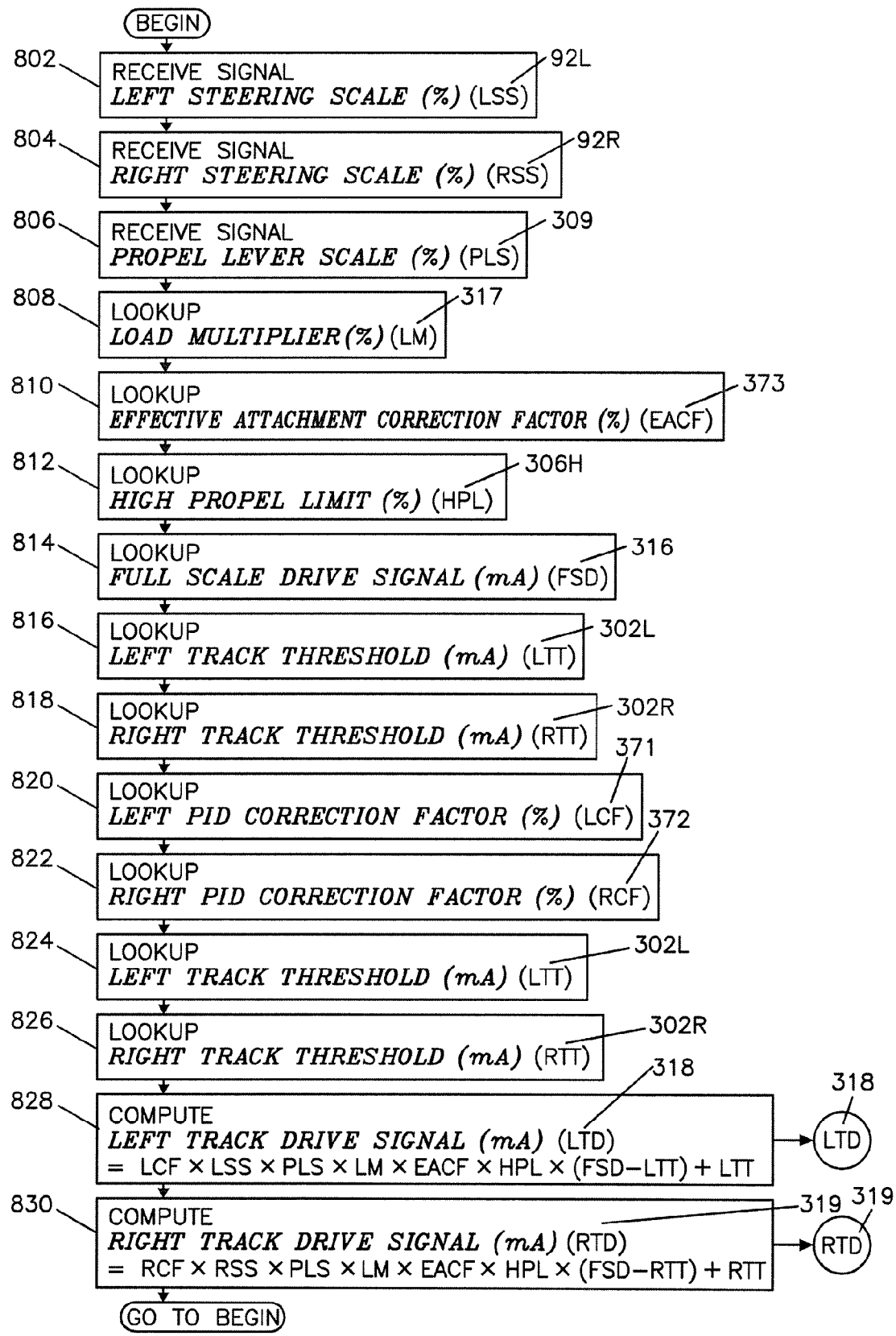
FIG. 27 illustrates a control process for calculating the left and right track drive signals given current input parameters in a high trench mode.

FIG. 27 illustrates a method by which the left track drive signal 318 and right track drive signal 319 are calculated and stored with the control system set to a high trench mode. Inputs for this method are retrieved in steps 802 through 826 and include the left steering scale 92L in step 802, the right steering scale 92R in step 804, the propel lever scale 309 in step 806, the load multiplier 317 in step 808, the effective attachment correction factor 373 in step 810, the high propel limit 306H in step 812, the full scale drive value 316 in step 814, the left track drive threshold 302L in step 816, the right track drive threshold 302R in step 818, the left PID correction factor 371 in step 820, the right PID correction factor 372 in step 822, the left track drive threshold 302L in step 824, and the right track drive threshold 302R in step 826. The left track drive signal 318 is calculated as shown and stored in step 828 and the right track drive signal 319 is calculated as shown and stored in step 830. The calculation cycle is then repeated.

Figure 28:
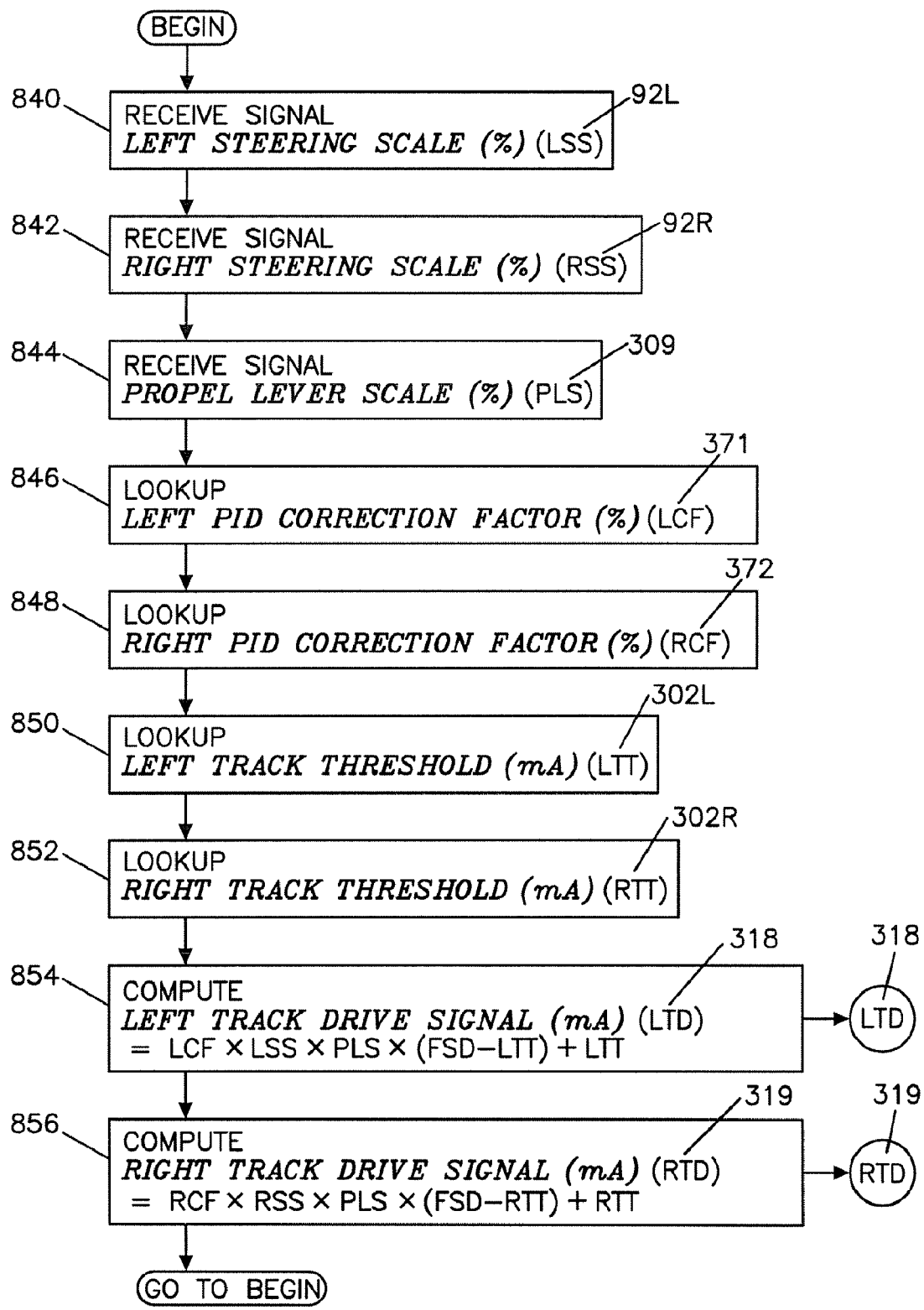
FIG. 28 illustrates a control process for calculating the left and right track drive signals given current input parameters in the transport mode.

FIG. 28 illustrates a method by which the left track drive signal 318 and right track drive signal 319 are calculated and stored with the control system set to the transport mode. Inputs for this method are retrieved in steps 840 through 852 and include the left steering scale 92L in step 840, the right steering scale 92R in step 842, the propel lever scale 309 in step 844, the left PID correction factor 371 in step 846, the right PID correction factor 372 in step 848, the left track drive threshold 302L in step 850, and the right track drive threshold 302R in step 852. The left track drive signal 318 is calculated as shown and stored in step 854 and the right track drive signal 319 is calculated as shown and stored in step 856. The calculation cycle is then repeated.

A feature in certain embodiments of the present invention concerns the load multiplier 317 and the associated operator modifiable proportional band 330 shown in FIGS. 13 through 15 and calculated in FIGS. 18 and 19. The load multiplier 317 provides engine 36 feedback to the control system and is used to calculate the left track drive signal 318 and right track drive signal 319 in the low and the high trench modes as shown in FIGS. 21 and 27 respectively.

The load multiplier 317 and proportional band 330 provide a benefit of continuously adjusting the track drive 32 and 34 speed or tractive effort (depending on the feedback selector 325 setting) based on engine load. This allows the engine 36 to continuously operate at high output levels and thus the track trencher 30 obtains high production levels. In other terms, if compacted soil is encountered by the track trencher 30 such that the engine 36 speed is pulled down, the load multiplier 317 is decreased which also results in a reduction of the track drive 32 and 34 speed or tractive effort. This action relieves some of the load on the engine 36 and allows the engine speed to increase. Conversely, if loose soil is encountered such that the engine 36 speed is raised up, the load multiplier 317 is increased which also results in an increase of the track drive 32 and 34 speed or tractive effort. This action increases the load on the engine 36 and decreases the engine speed. By proper adjustment of the control system variables, the engine 36 speed can be maintained in a region of high output and the track drive 32 and 34 speed or tractive effort continuously and automatically adjusted for this purpose.

Provisions allowing the operator to adjust the proportional band 330 by rotating the load control knob 380 provide a benefit enabling the operator to tune the track trencher 30 to a given environment or desired performance. Loading the engine 36 differently uses available horsepower and torque differently and thus allows the trenching results to be varied and tuned.

The computer network 182 disclosed in this specification may include one or more computing devices. These computing devices may be physically distributed across the track trencher 30 and may be incorporated within certain components of the track trencher 30, e.g. the engine 36 control system may have a computing device that in incorporated into the computer network 182. The computing devices may be known by various names including controller and computer. The computing devices may be digital or analogue and may be programmable by software.

In certain cases, the above disclosure references a specific system of units when discussing a particular variable, e.g. RPM. It is anticipated that an alternate system of units could be used in each of these cases. It is further anticipated that a transformed system of units could be used where desired, e.g. track rotational drive speed in RPM could be transformed into linear track speed in meters per minute.

Certain signals are described above and in the figures in terms of specific signal types and units, e.g. the propel signal 309 is described as having a range of −100% to 100% and the track pump drive signals 318 and 319 are described as using milliamperes (mA) of electrical current. Various other signal types and units may be substituted for those described above without departing from the true spirit of the present invention, e.g. the track pump drive signals 318 and 319 may be replaced with a pulse-width modulation (PWM) signal. Likewise, these signals may also be transformed from signal type to signal type within the control system itself, e.g. the propel signal 309 may originate as a millivolt (mV) signal at the propel control 90 and be transformed into a digital numeric signal. These transformations may occur in various locations including within the device generating the signal, within a signal converter, within a controller, and/or within the computer network 182.

In certain embodiments, the above disclosure measures an operational hydrostatic drive pressure at one point in a given hydraulic circuit for use in providing feedback to the control system. In other embodiments, the hydrostatic drive pressure may be measured at multiple points along the hydraulic circuit and averaged. In still other embodiments, the hydrostatic drive pressure may be measured across a pump or motor component by measuring the pressure on both sides of the component and subtracting their measured values.

The above specification sets forth embodiments of the present invention having various feedback control loops. Many types of loop control are known in the art. Included in these are various methods of error calculation, correction gains, ramp times, delays, value averaging, hysteresis, and other mathematical loop control techniques. It is anticipated that certain of these methods may be combined and implemented with the embodiments described above.

The acronym PID, as used in this specification, refers to a control loop technique known in the art as Proportional, Integral, and Derivative. In certain embodiments of the present invention, one or more control actions may be absent in the PID loop thus creating a PI (Proportional and Integral), PD (Proportional and Derivative), or P (Proportional) loop within the control system.

There is known in the art electric generators and electric motors that are coupled together to form an electric drive. Furthermore, an engine may power the electric generator, and the electric motor may be operatively connected to a track drive. It is anticipated that the above electric drive may be substituted for the hydrostatic drive in the above application. The control system of the current disclosure may be adapted to control the electric drive. In this case, controlling the speed of the electric drive is comparable to controlling the pump displacement of the hydrostatic drive and controlling the torque of the electric drive is comparable to controlling the pressure of the hydrostatic drive.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for controlling a left hydrostatic drive that drives a left propulsion structure of a vehicle and a right hydrostatic drive that drives a right propulsion structure of a vehicle, the left hydrostatic drive and the right hydrostatic drive being powered by an engine, the engine having an engine speed, the system comprising:

a controller that generates a left hydrostatic drive output signal for varying an output of the left hydrostatic drive and a right hydrostatic drive output signal for varying an output of the right hydrostatic drive, the controller using a plurality of operator selectable feedback algorithms to control the left hydrostatic drive output signal and the right hydrostatic drive output signal;

at least one of the feedback algorithms employing a load multiplier to scale the left hydrostatic drive output signal and the right hydrostatic drive output signal, the load multiplier being continuously defined as a function of the engine speed and by a band of engine speeds with an upper boundary and a lower boundary, the load multiplier being defined as 0% at and below the lower boundary, the load multiplier being defined as 100% at and above the upper boundary, and the load multiplier increasing from 0% to 100% from the lower boundary to the upper boundary;

at least one of the feedback algorithms employing a left propulsion speed correction factor derived from a difference between a calculated speed of the left hydrostatic drive and a measured speed of the left hydrostatic drive;

at least one of the feedback algorithms employing a right propulsion speed correction factor derived from a difference between a calculated speed of the right hydrostatic drive and a measured speed of the right hydrostatic drive;

at least one of the feedback algorithms employing a left propulsion pressure correction factor derived from a difference between a calculated hydraulic pressure of the left hydrostatic drive and a measured hydraulic pressure of the left hydrostatic drive;

at least one of the feedback algorithms employing a right propulsion pressure correction factor derived from a difference between a calculated hydraulic pressure of the right hydrostatic drive and a measured hydraulic pressure of the right hydrostatic drive;

the feedback algorithms including a first feedback algorithm that scales the left hydrostatic drive output signal using the load multiplier and the left propulsion speed correction factor, a second feedback algorithm that scales the left hydrostatic drive output signal using the load multiplier and the left propulsion pressure correction factor, a third feedback algorithm that scales the right hydrostatic drive output signal using the load multiplier and the right propulsion speed correction factor, and a fourth feedback algorithm that scales the right hydrostatic drive output signal using the load multiplier and the right propulsion pressure correction factor; and a user interface that allows an operator to manually adjust the upper boundary and the lower boundary of the band of engine speeds.

2. The system of claim 1, wherein a width of the band of engine speeds remains constant as the operator adjusts the upper boundary and the lower boundary.

3. The system of claim 1, wherein the user interface includes a dial.

4. The system of claim 1, wherein within the band of engine speeds the load multiplier is directly proportional to the engine speed.

5. The system of claim 1, wherein the left propulsion speed correction factor and the right propulsion speed correction factor are calculated using a PID equation.

6. The system of claim 5, wherein the left propulsion pressure correction factor and the right propulsion pressure correction factor are calculated using a PID equation.

7. The system of claim 1, wherein the left hydrostatic drive output signal and the right hydrostatic drive output signal are further scaled by steering factors related to a steering control position.

8. A system for controlling a propulsion system of an excavator, the propulsion system including a left propulsion structure driven by an output from a first hydrostatic drive and a right propulsion structure driven by an output from a second hydrostatic drive, the first hydrostatic drive and the second hydrostatic drive being powered by an engine, the system comprising:

a controller that generates a first hydrostatic drive output signal for varying the output of the first hydrostatic drive and a second hydrostatic drive output signal for varying the output of the second hydrostatic drive, the controller using feedback algorithms to determine a characteristic response of the first hydrostatic drive output signal and the second hydrostatic drive output signal;

wherein a first of the feedback algorithms employs a first correction factor to scale the first hydrostatic drive output signal and a second of the feedback algorithms employs a second correction factor to scale the second hydrostatic drive output signal; and wherein the first correction factor is based on a difference between a calculated hydraulic drive pressure of the first hydrostatic drive and a measured hydraulic drive pressure of the first hydrostatic drive, and wherein the second correction factor is based on a difference between a calculated hydraulic drive pressure of the second hydrostatic drive and a measured hydraulic drive pressure of the second hydrostatic drive.

9. The system of claim 8, wherein the first hydrostatic drive output signal and the second hydrostatic drive output signal are further scaled by a propel scale factor, the propel scale factor being proportional to a propel lever position, and wherein the first and second hydrostatic drive output signals are also scaled by steering factors related to a position of a steering control.

10. The system of claim 8, wherein the first and second correction factors are PID correction factors.

11. A system for controlling a propulsion system of an excavator, the propulsion system including a propulsion structure driven by an output from a hydrostatic propulsion drive, the hydrostatic propulsion drive being powered by an engine, the engine having an engine speed the system comprising:

a controller that generates a vehicle propulsion drive signal for varying the output of the hydrostatic propulsion drive, the controller using a feedback algorithm to determine a characteristic response of the vehicle propulsion drive signal;

the feedback algorithm using a load multiplier based on the engine speed of the engine as a factor for scaling the vehicle propulsion drive signal, the load multiplier varying directly with the engine speed when the engine speed is within a band of engine speeds; and the feedback algorithm also using a propulsion correction factor based on an operating characteristic of the hydrostatic propulsion drive as a factor for scaling the vehicle propulsion drive signal, wherein the operating characteristic of the hydrostatic propulsion drive is selected from the group consisting of: a) a difference between a calculated hydraulic pressure of the hydrostatic propulsion drive and a measured hydraulic pressure of the hydrostatic propulsion drive; and b) a difference between a calculated speed of the hydrostatic propulsion drive and a measured speed of the hydrostatic propulsion drive.

12. The system of claim 11, wherein the operating characteristic of the hydrostatic propulsion drive is the difference between the calculated hydraulic pressure of the hydrostatic propulsion drive and the measured hydraulic pressure of the hydrostatic propulsion drive.

13. The system of claim 11, wherein the operating characteristic of the hydrostatic propulsion drive is the difference between the calculated speed of the hydrostatic propulsion drive and the measured speed of the hydrostatic propulsion drive.

14. The system of claim 11, wherein the propulsion correction factor is calculated using a PID equation.

15. The system of claim 11, wherein an operator can select a first feedback algorithm using a first propulsion correction factor based on the difference between the calculated hydraulic drive pressure of the hydrostatic propulsion drive and the measured hydraulic pressure of the hydrostatic propulsion drive, wherein the operator can select a second feedback algorithm using a second correction factor based on the difference between the calculated speed of the hydrostatic propulsion drive and the measured speed of the hydrostatic propulsion drive, and wherein the first and second algorithms can not be selected at the same time.

16. A system for operating an excavator including an engine that powers a hydrostatic propulsion drive for driving a propulsion structure of the excavator, the engine having an engine speed, the excavator also including an excavation attachment and an actuator for raising and lowering the excavation attachment, the system comprising:

a controller that generates a vehicle propulsion drive signal for controlling an output from the hydrostatic propulsion drive, the controller using a plurality of operator selectable feedback algorithms to determine a characteristic response of the vehicle propulsion drive signal, the feedback algorithms using a plurality of factors to determine the characteristic response of the vehicle propulsion drive signal, the plurality of factors including:

a load multiplier defined as a function of the engine speed and by a band of engine speeds, the band of engine speeds having a lower engine speed boundary and an upper engine speed boundary, the load multiplier varying directly with the engine speed when the engine speed is within the band of engine speeds;

a first propulsion correction factor based on a difference between a calculated hydraulic pressure of the hydrostatic propulsion drive and a measured hydraulic pressure of the hydrostatic propulsion drive; and a second propulsion correction factor based on a difference between a calculated speed of the hydrostatic propulsion drive and a measured speed of the hydrostatic propulsion drive.

17. The system of claim 16, wherein the plurality of operator selectable feedback algorithms include a first feedback algorithm that uses the load multiplier and does not use the first or second propulsion correction factors, a second feedback algorithm that includes that uses the load multiplier and one of the first or second propulsion correction factors, and a third feedback algorithm that uses one of the first or second propulsion correction factors and does not use the load multiplier.

18. The system of claim 17, wherein the excavator comprises a trencher having a transport mode, a high trench mode and a low trench mode, wherein the first feedback algorithm corresponds to the low trench mode, wherein the second feedback algorithm corresponds to the high trench mode, and wherein the third feedback algorithm corresponds to the transport mode.

19. The system of claim 18, wherein a load limit of the load multiplier can be separately adjusted by the operator for the high trench mode and for the low trench mode.

20. The system of claim 18, wherein the first feedback algorithm is automatically selected in the low trench mode and the second and third feedback algorithms can not be selected in the low trench mode.

21. The system of claim 16, wherein the plurality of operator selectable feedback algorithms include a first feedback algorithm that uses the load multiplier and does not use the first or second propulsion correction factors, a second feedback algorithm that uses the load multiplier and the first propulsion correction factor and does not use the second propulsion correction factor, a third feedback algorithm that uses the load multiplier and the second propulsion correction factor and does not use the first propulsion correction factor, a fourth feedback algorithm that uses the first propulsion correction factor and does not use the load multiplier or the second propulsion correction factor, and a fifth feedback algorithm that uses the second propulsion correction factor and does not use the load multiplier or the first propulsion correction factor.

22. The system of claim 21, wherein the excavator comprises a trencher having a transport mode, a high trench mode and a low trench mode, and wherein the first feedback algorithm is automatically selected in the low trench mode and the second, third, fourth and fifth feedback algorithms can not be selected in the low trench mode.

23. The system of claim 22, wherein the second and third feedback algorithms can be individually selected in the high trench mode, and wherein the fourth and fifth feedback algorithms can not be selected in the high trench mode.

24. The system of claim 23, wherein the fourth and fifth feedback algorithms can be individually selected in the transport mode, and wherein the first, second and third feedback algorithms can not be selected in the transport mode.

25. The system of claim 23, wherein a load limit of the load multiplier can be separately adjusted by the operator for the high trench mode and for the low trench mode.

* * * * *